United States Patent
Lee et al.

(10) Patent No.: US 10,141,993 B2
(45) Date of Patent: Nov. 27, 2018

(54) MODULAR ANTENNA ARRAY BEAM FORMING

(71) Applicant: Intel Corporation, Santa Clara, CA (US)

(72) Inventors: Wook Bong Lee, Pleasanton, CA (US); Roya Doostnejad, Los Altos, CA (US); Oner Orhan, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 5 days.

(21) Appl. No.: 15/183,859

(22) Filed: Jun. 16, 2016

(65) Prior Publication Data

US 2017/0366242 A1    Dec. 21, 2017

(51) Int. Cl.

| H04B 7/04 | (2017.01) |
|---|---|
| H01Q 3/24 | (2006.01) |
| H04B 7/0456 | (2017.01) |
| H01Q 1/24 | (2006.01) |
| H01Q 3/26 | (2006.01) |
| H04B 7/0408 | (2017.01) |
| H04B 7/06 | (2006.01) |
| H04B 7/08 | (2006.01) |

(52) U.S. Cl.
CPC ........... *H04B 7/0482* (2013.01); *H01Q 1/243* (2013.01); *H01Q 1/246* (2013.01); *H01Q 3/24* (2013.01); *H01Q 3/2605* (2013.01); *H04B 7/0408* (2013.01); *H04B 7/0617* (2013.01); *H04B 7/086* (2013.01)

(58) Field of Classification Search
CPC .. H04B 7/0482; H04B 7/0408; H04B 7/0617; H04B 7/086; H04B 7/08; H01Q 1/243; H01Q 3/24; H01Q 1/246; H01Q 13/2605; H01Q 3/26
See application file for complete search history.

(56) References Cited

U.S. PATENT DOCUMENTS

| 4,965,605 A * | 10/1990 | Chang ....................... H01Q 3/24 343/700 MS |
|---|---|---|
| 9,300,369 B2 | 3/2016 | Nammi et al. |
| 2006/0062320 A1 | 3/2006 | Luz et al. |
| 2006/0264184 A1* | 11/2006 | Li ............................ H01Q 3/24 455/101 |
| 2010/0117913 A1* | 5/2010 | Jung ..................... H01Q 21/065 343/724 |

(Continued)

FOREIGN PATENT DOCUMENTS

| CN | 105471484 A | 4/2016 |
|---|---|---|
| WO | 2004082070 A1 | 9/2004 |

OTHER PUBLICATIONS

Office Action received for the corresponding U.S. Appl. No. 15/191,560 dated Feb. 23, 2017, 13 pages.

(Continued)

*Primary Examiner* — Sophia Vlahos
(74) *Attorney, Agent, or Firm* — Viering, Jenschura & Partner MBB

(57) ABSTRACT

A radio communication device includes a plurality of antenna arrays each configured to generate a steerable antenna beam according to a respective beamforming codeword, wherein each of the plurality of antenna arrays is configured to obtain the respective beamforming codeword from a single-antenna-array steering codebook that is reused by each of the plurality of antenna arrays, and a beamforming circuit configured to weight signals for the plurality of antenna arrays to coordinate the steerable antenna beams from a subset of the plurality of antenna arrays to form a combined antenna beam in a first steering direction.

8 Claims, 11 Drawing Sheets

(56) References Cited

U.S. PATENT DOCUMENTS

| | | | |
|---|---|---|---|
| 2013/0057432 A1 | 3/2013 | Rajagopal et al. | |
| 2013/0229309 A1* | 9/2013 | Thomas | H04B 7/0478 342/377 |
| 2013/0258972 A1* | 10/2013 | Kim | H04B 7/0617 370/329 |
| 2014/0050280 A1* | 2/2014 | Stirling-Gallacher | H04B 7/0486 375/296 |
| 2014/0198696 A1* | 7/2014 | Li | H04W 52/0229 370/311 |
| 2014/0203969 A1* | 7/2014 | Maltsev | H01Q 3/36 342/375 |
| 2014/0210666 A1* | 7/2014 | Maltsev | H01Q 25/00 342/368 |
| 2014/0341310 A1 | 11/2014 | Rahman et al. | |
| 2015/0288431 A1 | 10/2015 | Sorrells et al. | |
| 2016/0182138 A1* | 6/2016 | Xi | H04B 7/0456 375/267 |
| 2016/0344463 A1 | 11/2016 | Kim et al. | |
| 2017/0163326 A1* | 6/2017 | Kim | H04B 7/0617 |
| 2017/0214443 A1 | 7/2017 | Chen | |

OTHER PUBLICATIONS

K. Sayidmarie et al., "Synthesis of Wide Beam Array Patterns Using Quadratic-Phase Excitations", International Journal of Electromagnetics and Applications, 2013, pp. 127-135, vol. 3(6), ResearchGate.
The Extended European Search Report for the Patent Application No. 17170627.8 dated Aug. 18, 2017, 9 pages.
The European Office Action for the Patent Application No. 17170627.8 dated May 18, 2018, 7 pages.

* cited by examiner

| φ | 1RF | 2RF | 4RF | 8RF |
|---|---|---|---|---|
| (-60,-52) | 0 | 0 | 0.3 | 0.8 |
| (-51,-42) | 0 | 0 | 0.4 | 0.9 |
| (-41,-32) | 0 | 0 | 0.5 | 1.0 |
| (-31,28) | 0 | 0 | 0.8 | 1.2 |
| (29,38) | 0 | 0 | 0.5 | 1.0 |
| (39,48) | 0 | 0 | 0.4 | 0.9 |
| (49,59) | 0 | 0 | 0.3 | 0.8 |

MODULAR ANTENNA ARRAY BEAM FORMING

TECHNICAL FIELD

Various embodiments relate generally to steering of modular antenna arrays.

BACKGROUND

Antenna-based communication systems may utilize beamforming in order to create steered antenna beams with an antenna array. Beamforming systems may adjust the delay and/or gain of each of the signals transmitted by (or received with in the receive direction) the elements of an antenna array in order to create patterns of constructive and destructive inference at certain angular directions. Through precise selection of the delays and gains of each antenna element, a beamforming architecture may control the resulting interference pattern in order to realize a steerable "main lobe" that provides high beamgain in a particular direction. Many beamforming systems may allow for adaptive control of the beam pattern through dynamic adjustment of the delay and gain parameters for each antenna element, and accordingly may allow a beamformer to constantly adjust the steering direction of the beam such as in order to track movement of a transmitter or receiver of interest.

Beamforming architectures may conventionally employ one or both of digital and radio frequency (RF) processing in order to apply the desired delay and gain factors at each element of the array. Phased antenna arrays are a particularly favored RF beamforming technique for narrowband signals which relies on the approximate equivalence between phase shifts and time delays for narrowband signals. Accordingly, phased antenna arrays may place an RF phase shifter in the signal path of each antenna element and allow the individual phase shift values to be adjusted in order to steer the resulting antenna beam. Although many phased array designs achieve sufficient performance with phase-only control, variable gain amplifiers and other techniques such as tapering may additionally be implemented in order to also allow for gain adjustment.

In contrast to the analog RF processing of RF beamformers, digital beamformers may employ digital processing in the baseband domain in order to impart the desired phase/delay and gain factors on the antenna array. Accordingly, in digital beamforming systems, the phase and gain for each antenna element may be applied digitally to each respective antenna signal in the baseband domain as a complex weight. The resulting weighted signals may then each be applied to a separate radio frequency (RF) chain, which may each mix the received weighted signals to radio frequencies and provide the modulated signals to a respective antenna element of the antenna array. As each antenna element in a digital beamforming system requires an exclusive RF chain, many digital beamforming solutions may require a substantial amount of hardware and thus have considerable cost and power-consumption rates.

Hybrid beamforming solutions may apply beamforming in both the baseband and RF domains, and may utilize a reduced number of RF chains connected to a number of low-complexity analog RF phase shifters. Each analog RF phase shifter may feed into a respective antenna element of the array, thus creating groups of antenna elements that each correspond to a unique RF phase shifter and collectively correspond to a common RF chain. Such hybrid systems may thus reduce the number of required RF chains by accepting slight performance degradations resulting from the reliance on RF phase shifters instead of digital complex weighting elements.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 10 shows a table detailing a first beam broadening technique;

DESCRIPTION

Figure 1:
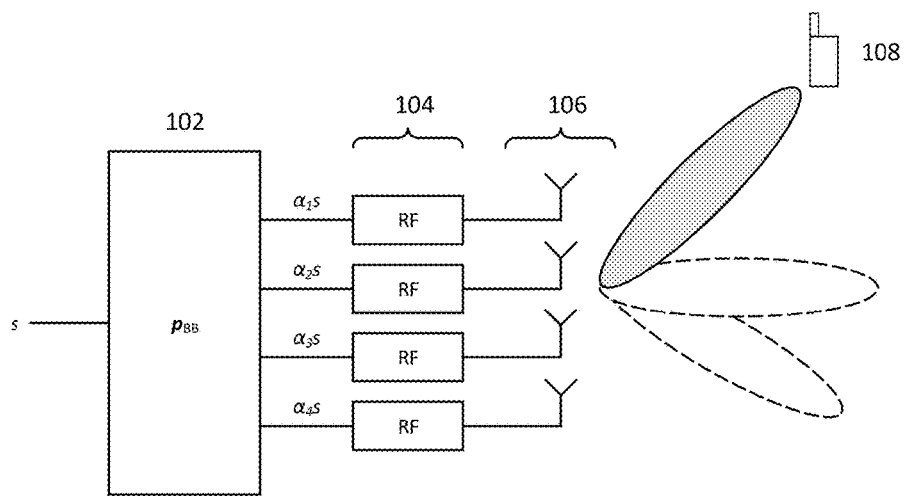
FIG. 1 shows an RF beamforming architecture.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network (RAN) section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions.

Beamforming systems have been targeted as a potentially important component in high frequency next-generation communication networks such as millimeter wave (mm-Wave) and other so-called "5G" radio technologies. These radio technologies may operate at carrier frequencies of 30 GHz and above, and may need to rely on high beamforming gains in order to compensate for the high path loss associated with carrier frequencies in these ranges.

Figure 2:
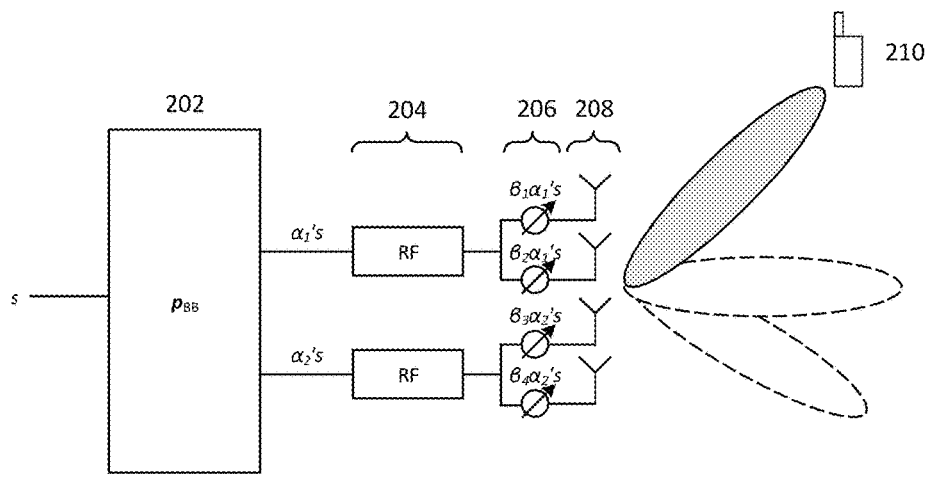
FIG. 2 shows a hybrid digital/RF beamforming architecture.

Beamforming systems may perform processing in one or both of the baseband and RF domains to shape antenna array beam patterns. FIGS. 1 and 2 show two simplified beamforming approaches as deployed for an exemplary four-element antenna array. Although the following description may focus on a transmit beamforming context, skilled persons will appreciate the ability to likewise use an analogous implementation for receive beamforming, which may include combining the signals received at the antenna elements according to a complex weight array in order to adjust the received beam pattern.

FIG. 1 illustrates a simplified digital baseband beamforming architecture that digitally applies complex beamforming weights (composed of both a gain and phase factor) in the baseband domain. As shown in FIG. 1, digital beamformer 102 may receive baseband symbol s and subsequently apply a complex weight vector $p_{BB}=[\alpha_1\ \alpha_2\ \alpha_3\ \alpha_4]^T$ to s to generate $p_{BB}$s, where each element $\alpha_i$, i=1, 2, 3, 4 is a complex weight (comprising a gain factor and phase shift). Accordingly, each resulting element $[\alpha_1 s\ \alpha_2 s\ \alpha_3 s\ \alpha_4 s]^T$ of $p_{BB}$s may be baseband symbol s multiplied by some complex weight $\alpha_i$. Digital beamformer 102 may then map each element of $p_{BB}$s to a respective RF chain of RF system 104, which may each perform digital to analog conversion (DAC), radio carrier modulation, and amplification on the received weighted symbols before providing the resulting RF symbols to a respective element of antenna array 106. Antenna array 106 may then wirelessly transmit each RF symbol. This exemplary model may also be extended to a multi-layer case where a baseband symbol vector s containing multiple baseband symbols $s_1$, $s_2$, etc., in which case baseband precoding vector $p_{BB}$ may be expanded to a baseband precoding matrix $p_{BB}$ for application to baseband symbol vector s. In this case, $\alpha_i$, i=1, 2, 3, 4 are row vectors, and $p_{BB}s=[\alpha_1 s\ \alpha_2 s\ \alpha_3 s\ \alpha_4 s]T$. Thus, after multiplying $p_{BB}$ and s, the overall dimension is the same as the overall dimension at the output of digital beamformer 102. The below descriptions thus refer to digital beamformer 102 as $p_{BB}$ and transmit symbol/vector as s for this reason while this model can be extended to further dimensions as explained.

By manipulating the beamforming weights of $p_{BB}$, digital beamformer 102 may be able to utilize each of the four antenna elements of antenna array 106 to produce a steered beam that has a greater beamgain compared to a single antenna element. The radio signals emitted by each element of antenna array 106 may combine to realize a combined waveform that exhibits a pattern of constructive and destructive interference that varies over distances and direction from antenna array 106. Depending on a number of factors (including e.g. antenna array spacing and alignment, radiation patterns, carrier frequency, etc.), the various points of constructive and destructive interference of the combined waveform may create a focused beam lobe that can be "steered" in direction via adjustment of the phase and gain factors $\alpha_i$ of $p_{BB}$. FIG. 1 shows several exemplary steered beams emitted by antenna array 106, which digital beamformer 102 may directly control by adjusting $p_{BB}$. Although only steerable main lobes are depicted in the simplified illustration of FIG. 1, digital beamformer 102 may be able to comprehensively "form" the overall beam pattern including nulls and sidelobes through similar adjustment of $p_{BB}$.

In so-called adaptive beamforming approaches, digital beamformer 102 may dynamically change the beamforming weights in order to adjust the direction and strength of the main lobe in addition to nulls and sidelobes. Such adaptive approaches may allow digital beamformer 102 to steer the beam in different directions over time, which may be useful to track the location of a moving target point (e.g. a moving receiver or transmitter). In a mobile communication context, digital beamformer 102 may identify the location of a target User Equipment (UE) 108 (e.g. the direction or angle of UE 108 relative to antenna array 106) and subsequently adjust $p_{BB}$ in order to generate a beam pattern with a main lobe pointing towards UE 108, thus improving the array gain at UE 108 and consequently improving the receiver performance. Through adaptive beamforming, digital beamformer 102 may be able to dynamically adjust or "steer" the beam pattern as UE 108 moves in order to continuously provide focused transmissions to UE 108 (or conversely focused reception).

Digital beamformer 102 may be implemented as a microprocessor, and accordingly may be able to exercise a high degree of control over both gain and phase adjustments of $p_{BB}$ through digital processing. However, as shown in FIG. 1 for RF system 104 and antenna array 106, digital beamforming configurations may require a dedicated RF chain for each element of antenna array 106 (where each RF chain performs radio processing on a separate weighted symbol $\alpha_i s$ provided by digital beamformer 102); i.e. $N_{RF}$=N where $N_{RF}$ is the number of RF chains and N is the number of antenna elements. Given the complex assortment of circuitry required for each RF chain (DAC, amplification, mixing, etc.), such digital beamforming approaches may be relatively expensive and power-inefficient. These issues may be compounded as the involved number of antennas increases, which may be particularly problematic for the massive antenna arrays targeted for next-generation technologies that will include tens or even hundreds of antenna elements.

Hybrid beamforming has thus been offered to resolve the problematic cost and power consumption issues of digital beamforming. Such hybrid beamforming configurations may utilize a limited number of RF chains (i.e. $N_{RF}$<N) and apply beamforming in both the baseband and RF domains. FIG. 2 shows a simplified hybrid beamforming architecture that similarly includes a four-element array 208; however, as shown in FIG. 2 RF system 204 includes only two RF chains ($N_{RF}$=2 and N=4) compared to the four-RF chain configuration of RF system 104.

Likewise to digital beamformer 102, hybrid beamformer 202 may digitally apply a complex beamforming weight vector $p_{BB}$ to baseband symbol s. As RF chain 204 includes only two RF chains, $p_{BB}$ may be only length-two, i.e. $p_{BB}=[\alpha_1'\ \alpha_2']^T$; accordingly, digital beamformer may provide $\alpha_1$'s and $\alpha_2$'s to the RF chains of RF system 204. RF system 204 may then process the weighted symbols $\alpha_1$'s and $\alpha_2$'s and split the resulting radio symbols into two equivalent streams to each provide to a respective phase shifter of phase shifter array 206. Each phase shifter of phase shifter array 206 may then apply a respective complex weight $\beta_1$, $\beta_2$, $\beta_3$, or $\beta_4$ to the corresponding radio symbol. Phase shifter array 206 may then provide the resulting weighted symbols to antenna array 208 for transmission. The operation of digital beamformer 202 and phase shifter array 206 in matrix form as $p_{RF}p_{BB}$s where $p_{RF}=[\beta_1\ 0;\ 0;\ \beta_3;\ 0\ \beta_4]$.

Similarly to the digital beamforming of FIG. 1, the hybrid beamforming architecture of FIG. 2 may adjust the beam pattern produced by antenna array 208 via manipulation of $p_{RF}$ and $p_{BB}$. As $p_{RF}$ may operate exclusively in the RF domain, hybrid beamformers may utilize low-complexity analog phase shifters for phase shifter array 206 due to the potential complications of using digital circuitry for RF domain processing. Although referred to as phase shifters, phase shifter array 206 may be able to apply both a phase shift and weighting factor; in other words, each $\beta_n$, n=1, . . . , N may be a complex weight composed of both a phase shift and a gain factor, e.g. of the form $Ae^{j\theta}$ where A is the gain factor and $\theta$ is the phase shift.

Hybrid beamformers may thus apply beamforming in two (or more) stages: in the baseband domain in the form of $p_{BB}$ and in the RF domain in the form of $p_{RF}$ (as further detailed below, hybrid beamformers may additionally employ intermediate frequency (IF) beamforming as $p_{IF}$). Accordingly, hybrid beamformers may need to dynamically control the overall beamforming effect by executing control over both the baseband and RF domains, which may include processing tasks to determine the direction of one or more target transmitters or receivers and calculate the appropriate beamforming weights for $p_{BB}$ and $p_{RF}$ to steer the beam towards the target points. Hybrid beamformers may therefore include a control module configured to calculate the appropriate beamforming weights and indicate the calculated beamforming weights to the digital beamforming unit (e.g. digital beamformer 102 or 202) and the RF beamforming unit (e.g. phase shifter array 206). The digital and RF beamforming units may then be responsible for implementing the assigned beamforming weights.

As previously indicated, the digital beamforming unit may be implemented as a microprocessor, and accordingly may be configured to apply the assigned baseband beamforming weights $p_{BB}$ digitally, such as e.g. by multiplying a complex baseband symbol by the corresponding complex weights $\alpha$ of $p_{BB}$. The RF beamforming unit may be realized as an array of analog phase shifters, which may operate as either analog phase shifting circuitry or time-delay circuitry (in view of the time delay-phase shift equivalence for narrowband signals). In contexts where both gain and phase is used for RF beamforming, the RF beamforming unit may additionally include an array of gain elements such as variable gain amplifiers. Accordingly, the control unit may provide the complex weights $\beta$ of $p_{RF}$ to the analog phase shifters which may subsequently adjust the involved circuitry in order to apply the assigned phase shift and/or gain factor.

The control unit may thus need to specify an individual phase shift for each RF phase shifter, e.g. $\beta_n$ phase values for n=1, ..., N. Assuming digital control, the control unit may need to represent each of the N phase values with B bits, thus yielding a total number of bits NB required for each beam pattern adjustment. As the amount of control signaling required to direct the N RF phase shifters increases with the size of the antenna array, massive array configurations may have substantial control signaling overhead involved in providing the NB control bits to the RF phase shifters. In particular for 'distributed' architectures with the RF modules located at a remote location relative to the baseband and control modules (e.g. a Remote Radio Unit (RRU) located at the top of tower compared to a ground-level Baseband Unit (BBU)), the infrastructure required to support such high control overhead may be problematic.

Hybrid beamforming architectures may therefore utilize a "codebook" approach in order to reduce the control signaling overhead involved in controlling the RF phase shifters. In such codebook schemes, the RF beamforming unit may include a memory that stores a codebook containing a plurality of codewords. Each codeword may specify a particular phase shift for a respective phase shifter of the RF phase shifter array to realize. The codewords of the codebook may be pre-configured in advance, and may each collectively specify a particular beam pattern that will be generated by the attached antenna array upon application of the corresponding phase shifts by the RF phase shifters. For example, each codeword may correspond to a different direction/angle, and accordingly selection of different codewords may cause the RF phase shifters to implement appropriate phase shifts in order to steer the beam pattern produced by the antenna array in different directions.

In order to simplify control signaling, each codeword in the codebook may be pre-assigned a codeword index that uniquely identifies the codeword within the codebook. Accordingly, as opposed to specifying an individual value for each phase shift, the control unit may instead identify a desired codeword (e.g. a codeword that matches the direction/angle of a target point) and specify the selected codeword to the RF phase shifter array by signaling the codeword index. The RF phase shifter array may receive the codeword index, retrieve the corresponding codeword from the codebook memory (i.e. retrieve the phase shifts that collectively compose the codeword), and apply the phase shifts of the assigned codeword at the phase shifters of the RF phase shifter array.

Figure 3:
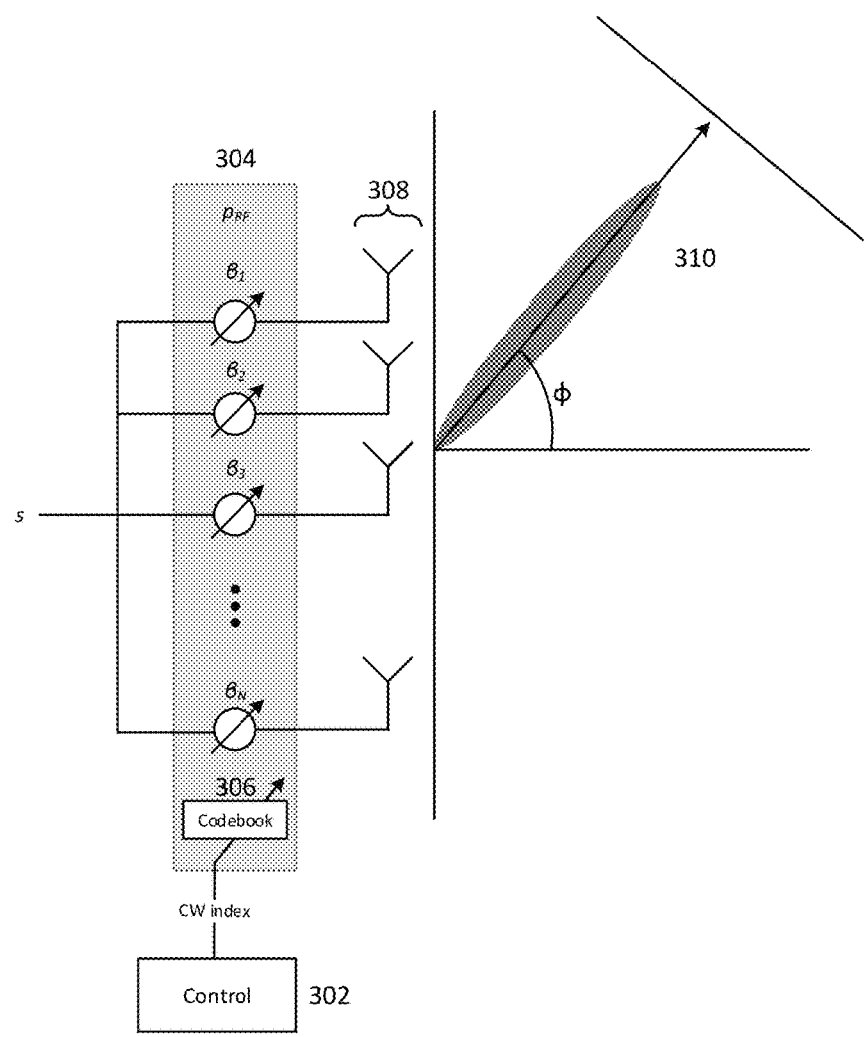
FIG. 3 shows an illustration of beamsteering for an antenna array.

FIG. 3 shows an exemplary implementation of a codebook-based control approach in which control circuit 302 may provide RF phase shifter array 304 with control signaling in the form of codeword (CW) indices. As previously detailed, control circuit 302 may select a codeword based on the direction/angle of a target point, such as by determining an optimal direction/angle estimation and selecting the codeword that provides a direction/angle that most closely matches the optimal angle/direction. RF phase shifter array 304 may then access codebook memory 306 to retrieve the corresponding codeword $\beta=[\beta_1 \beta_2 \ldots \beta_N]$, where each $\beta_n$, n=1, ..., N gives the assigned phase shift for the $n^{th}$ RF phase shifter of RF phase shifter array 304. RF phase shifter array 304 may then apply the phase shift values $\beta_n$, n= 1, ..., N, at each respective phase shifter in order to generate the antenna beam pattern corresponding to the specified codeword $\beta$ at antenna array 308.

The effectiveness of the codebook may depend on the total number of codewords in the codebook. For example, in a scenario where each codeword corresponds to a different steering angle of antenna array 308, a large number of codewords in codebook memory 306 may provide control circuit 302 with a relatively fine steering sensitivity due to the greater likelihood that an available codeword will closely match the optimal codeword. Such tighter sensitivity may come at the expense of larger storage requirements and higher control signaling overhead, as codebook memory 306 may need to store a substantial number of codewords and require greater specificity to differentiate between the codewords. In contrast, a smaller codebook may lead to some performance degradation due to the reduced sensitivity but also require less memory and control signaling.

As beamforming relies on manipulating antenna signals to create specific patterns of constructive and destructive interference, the beamforming weights of each codeword may depend on the arrangement of the elements of antenna array 308. For example, antenna array 308 may be arranged as a uniform linear array; in other words, all elements of antenna array 308 may lie on a single substantially straight line and may be uniformly spaced by a spacing distance d, i.e. each element may be separated from its neighboring elements by distance d.

In such a uniform linear array configuration, control circuit 302 may employ an antenna array steering technique known as progressive phase shifting to steer antenna beam 310 produced by antenna array 308 in a particular angular direction $\phi$ relative to antenna array 308. In order to produce a maximum beamgain at direction $\phi$, the signals emitted by each element of antenna array 308 may need to constructively interfere at each point along the wavefront perpendicular to direction $\phi$ (as shown in FIG. 3), i.e. each signal emitted by each element of antenna array 308 may need to have the same phase along the wavefront perpendicular direction $\phi$. As each element of antenna array 308 may be located at variable distances from the common wavefront trigonometrically related to the angle $\phi$ and spacing d, the signal provided to each antenna element may need to be shifted by the phase shifters of RF phase shift array 308 by a different amount in order to produce emitted signals with identical phase at the wavefront. Given the uniform spacing d between the elements of antenna array 304, the difference in the phase shifts between each element may be given as $\theta = -kd \sin(\phi)$, where $k = 2\pi/\lambda$ is the wavenumber. Accordingly, antenna array 308 may produce a combined beam with maximum beamgain in direction $\phi$ if the phase applied by each phase shifter of phase shifter array 304 is separated by $\theta$ from the phase applied by its neighboring phase shifters; in other words, if $|<\beta_n - <\beta_{n+1}| = \theta = kd \sin(\phi)$ for $n = 1, \ldots, N-1$ (where $<\beta_n$ gives the phase of $\beta_n$).

Accordingly, control circuit 302 may select a codeword from the codebook that satisfies the requirements of progressive phase shifting for $\phi$ in order to steer antenna array 308, i.e. a codeword $\beta$ containing N phase values $\beta_n$ in which each $\beta_n$ is separated from $\beta_{n\pm1}$ by a phase shift of $\theta$. In a simplified exemplary codebook approach with e.g. 1 degree resolution and 120 degree range (e.g. for a sectorized antenna array adapted for a three-sector configuration), the codebook may contain e.g. 120 codewords where each codeword provides vector $\beta$ of phase shifts that satisfy the constraints of progressive phase shifting for each of $\phi = \{-60, -59, \ldots, 58, 59\}$ (in degrees); in other words, each codeword $\beta$ is tailored to cause antenna array 308 to steer beam 310 in a particular angular direction in the range of −60, −59, . . . , 58, 59 (degrees). In order to assign a codeword for $\phi$ to RF phase shifter array 304, control circuit 302 may identify $\phi'$ (the actual angular direction of the target point, determined e.g. based on the direction of a target transmitter or receiver) and compare $\phi'$ to the steering directions that each codeword of the codebook is optimized for. Control circuit 302 may select the codeword that corresponds to a steering angle $\phi$ that most closely matches $\phi'$ (e.g. quantize $\phi'$ to the 1 degree resolution grid range to obtain $\phi$), identify the codeword index of the codebook that uniquely identifies the selected codeword, and provide the codeword index to codebook circuit 306. Codebook circuit 306 may then access the codebook memory to retrieve the codeword $\beta$ corresponding to the specified codeword index and apply the beamforming weights $\beta_1, \ldots, \beta_N$ to RF phase shifter array 304. RF phase shifter array 304 may then apply the assigned phase shifts to a transmit symbol s (other signal path circuitry and components are omitted in FIG. 3 for simplicity) and transmit the resulting signals with antenna array 308. The combined beam pattern produced by antenna array 304 may thus produce a focused beam with maximum beamgain in direction $\phi$.

Codewords such as those detailed above which specify neighboring phase shifts separated by $\theta$ to generate steering angle $\phi$ may require a high resolution at RF phase shifter array 304. While RF phase shifters 304 may operate with analog RF circuitry, the phase shifters may be digitally controlled. For example, as noted above each of RF phase shifters 304 may be controlled by B bits and thus be able to be set to $2^B$ separate complex weighting settings, e.g. B=3 bits to provide $2^3 = 8$ possible phase shifts which yields 360/8=45 degree precision. B may similarly be scaled to other resolution values according to a tradeoff between control signaling complexity/overhead and control resolution. However, this may be inefficient and require high capacity control signal paths to provide the NB bits to each of the N phase shifters of RF phase shifter array 308.

Codebook circuit 306 may thus control each n-th phase shifter of RF phase shifters 304 by providing C bits that uniquely specify the assigned complex weight $\beta_n$. The resolution available at each of RF phase shifters 304 may thus be constrained by the digital control resolution $2^C$. For example, if codebook circuit 306 utilizes e.g. C=7 bits to indicate each phase shift $\beta_n$, codebook circuit 306 may be able to indicate the assigned phase shift values $\beta$ with at least 1 degree precision over a 120 degree steering range (where $2^7 = 128$, thus providing at least 128 different available steering direction settings).

As each of RF phase shifters 304 may need to be spaced in phase by $\theta$, it may be in extremely rare cases that $\theta$ is a multiple of 45 degrees, thus precluding an optimal phase separation $\theta$ between the antenna elements. Accordingly, some approximation or optimization may be needed in order to obtain the same effectiveness of an RF phase shifter array with higher or infinite resolution control signaling. In the simplest case with e.g. B=3, the phase of each $\beta_n$ may simply be quantized to a 45 degree grid, i.e. the closest point on the grid to the desired phase satisfying phase separation $\theta$. As this may result in some performance degradation, 'optimized' codewords may instead be employed. These optimized codewords may rely on non-linear phase separation in order to 'mimic' or 'approximate' linearly progressive phase shifted codewords. For example, optimized non-linear codewords may be calculated in a pre-deployment optimization stage in order to determine which phase shifter vector $\beta$ best approximates linearly progressive codeword for each steering direction $\phi$. In an exemplary scenario, a rounding function that models the maximum beamgain of an antenna array may be utilized in order to determine an optimized codeword for each steering direction. Expressed mathematically, optimized codewords may be determined by evaluating $\text{argmax}_\beta F(\beta, \phi)$ where $F(\beta, \phi)$ provides a model of the beamgain in angular direction $\phi$ for a given codeword $\beta$; in other words, the codeword $\beta$ that provides the maximum beamgain in direction $\phi$ is returned as the codeword assigned for steering in direction $\phi$. This optimization process may be performed for each desired steering direction $\phi$ supported by the codebook in order to determine codebook of 'optimized' codewords that rely on non-linear progressive phase shifts. In a brute force approach, $F(\beta, \phi)$ may be evaluated for each possible vector $\beta$ and each desired $\phi$ in order to determine the $\beta$ that maximized $F(\beta, \phi)$ for each desired steering angle $\phi$. While the evaluation to determine such optimized codewords may be computationally expensive, this optimization stage may be performed prior to deployment in order to obtain the codebook, which may then simply be loaded into control circuit 302 and codebook circuit 306 for access during operation. It is noted that any of these codebook design techniques, including linearly progressive phase shifting and non-linear 'optimization', may be utilized to generate the codebook for the modular beamforming architectures detailed herein.

Regardless of the specifics of the codebook employed by control circuit 302 and codebook circuit 306, control circuit 302 may be configured to select an appropriate codeword index that approximately matches a desired beam steering angle and indicate the selected codeword index to codebook circuit 306 for subsequent deployment at RF phase shifters 304. The notation $V(\theta)$ will thus be used to denote a codeword that either matches or approximates a codeword with a progressive linear phase shift $\theta$ between neighboring elements. Accordingly, a given codeword $V(\theta)$ may either be a linearly progressive phase shifted codeword containing elements that are each separated in phase from neighboring elements by $\theta$ (which may additionally be quantized) or an optimized non-linear codeword that produces a steering direction that approximately matches a linearly progressive phase shifted codeword containing elements that are each separated in phase from neighboring elements by θ. Accordingly, a given V(θ) may produce a steering angle φ where θ=−kd sin(φ). It is thus appreciated that the beamforming techniques detailed herein are not limited to any particular codebook design and may utilize any codebook configuration that contains codewords for steering antenna array beams in particular directions. Furthermore, while the antenna arrays detailed herein are described in the context of single-dimensional (e.g. linear arrays), the arrays, codebook, and beam patterns may be analogously expanded to multiple dimensions such as e.g. planar arrays.

The beamforming approaches detailed thus far have primarily referred to a single user case, e.g. a single target point (either a transmitter or a receiver) at which an antenna array is steered. However, beamforming may be particularly useful for other scheduling scenarios that include multiple users, such as where one subset of elements of the antenna array transmits a first data stream in a first direction to a first user (or conversely receive a first data stream from a first user), another subset of elements of the antenna array transmits a second data stream in a second direction to a second user, etc. Accordingly, as opposed to using the entire antenna array to steer in a single direction, the antenna array may be divided into subsets that are each responsible for steering in a different direction, i.e. may create an individual steerable beam with each subset The scheduling scenario may additionally be dynamic, where the antenna array is expected to be able to switch between single and multi-user operation (with a configurable plurality of users) over time.

Different phase and gain factors may be needed to effectively steer different sizes of antenna arrays; for example, an 8-element array may call for different beamforming weights than a 4-element array. In order to support a variable number of steerable beams, beamforming designs may therefore need a separate codebook for each setting, e.g. a different codebook for each possible setting of the number of elements per beam. Accordingly, the RF unit may need to store multiple separate codebooks, e.g. one for each element-to-beam setting. The beamforming control unit (analogous to control circuit 302) may then need to determine the desired number of separate beams, assign antenna elements to each beam, calculate the appropriate beamforming weights for the digital and RF beamformers (in addition to IF, if applicable), and provide control signaling to the digital and RF beamformers that specifies the selected beamforming setting.

For example, an exemplary hybrid beamformer may have eight total RF chains that are each connected to a different set of L antenna elements. The hybrid beamformer may be able to generate an individual beam with each RF chain (L elements per beam) and be able to assign multiple RF chains to generate a combined beam (more than L elements per beam, e.g. 2L for two RF chains, 4L for four RF chains, etc.), i.e. the hybrid beamformer may be able to create between one (all RF chains assigned to a combined beam) and eight (each RF chain assigned to a different beam) steerable beams. As previously noted, it may be desirable for the hybrid beamformer to dynamically adjust the number of beams, such as to support a variable number of users. For example, the hybrid beamformer may initially be transmitting to (and optionally also receiving with) two users at different locations. Accordingly, the beamforming control unit may select to dedicate four of the eight RF chains to the first user and the remaining four RF chains to the second user, i.e. may utilize the first four RF chains and the corresponding antenna elements (each connected to a different RF phase shifter) to generate a first beam directed towards the first user and the second four RF chains and the corresponding antenna elements to generate a second beam directed towards the second user. The beamforming control unit may therefore utilize a specific "4RF" codebook (e.g. a codebook that utilizes four RF chains per beam, i.e. 4L antenna elements per beam) to select appropriate codewords from the codebook for both the first and second users, i.e. a first codeword to steer one beam towards the first user (depending on the steering direction and nulls/sidelobes, if applicable) and a second codeword to steer the other beam towards the second user. The beamforming control unit may then provide the RF unit with control signaling that specifies the 4RF codebook along with the first and second codeword indices. Similarly to as shown in FIG. 3, the RF unit may then enact the specified codewords by setting the phase shifters of the first four RF chains according to the first codeword index (by accessing the 4RF codebook to retrieve the phase shift values corresponding to the specified first codeword) and the phase shifters of the second four RF chains according to the second codeword index. The beamforming control unit may also specify beamforming weights to the digital baseband beamformer, which may either similarly use a codebook or be able to directly select beamforming weights without the use of a codebook. As the control unit and digital baseband beamformer may be located in the same location or a proximate location (compared to the potential tower-mounted location of an RF unit), it may be relatively straightforward to use a codebook-less approach in which the beamforming control unit directly specifies the digital beamforming weights to the digital baseband beamformer.

In an adaptive multi-user scenario, the number of target users may change. For example, the beamforming control unit may identify a third user, and accordingly may need to adjust the beamforming settings to generate a third beam for the third user. The beamformer may then select to re-assign two of the first or second four RF chains to the third user, i.e. may assign two RF chains to the first user, two other RF chains to the second user, and the four remaining RF chains to the third user (although numerous variations are possible). Even if the first and second users remain in the same location (thus requiring substantially the same steering direction), the beamforming weights required to steer a beam from four RF chains will differ from the beamforming weights required to steer a beam from two RF chains. Accordingly, the beamforming control unit may need to utilize a different codebook for the 2RF setting, thus also requiring the RF unit to additionally store a 2RF codebook. The beamforming control unit may then select the appropriate codeword indices from the 2RF codebook (depending on the directions of the first and second users) and the 4RF codebook (depending on the direction of the third user) and specify the codeword indices to the RF unit. In order to differentiate between the 2RF and 4RF codebooks, the beamforming control unit may also need to identify the codebook for each codeword index. The RF unit may similarly retrieve the beamforming weights for the specified codebooks with the codebook database and apply the beamforming weights to the proper phase shifters.

The control signaling and codebook storage specifics of beamforming systems may thus vary depending on the number of supported users, number of RF chains, and number of antenna elements per RF chain. In particular for large arrays and numbers of supported users, multi-codebook support may be inefficient in terms of both storage requirements and control signaling overload. As will be detailed, a more effective beamforming approach may be realized that modularizes the antenna array and re-uses the same reduced-size codebook across each of the modules to generate a steerable beams at each module. Thus, instead of needing separate codebooks for each possible setting for the number of elements per beam, the modular beamforming architecture may utilize only a single steering codebook that is reused for the codewords at each module. Such may as a result reduce the codebook storage and control signaling requirements without sacrificing functionality. As will be later detailed, the modular beamforming architecture may additionally be able to implement so-called "beam broadening" techniques in order to create wider beams, which may rely on a separate beam broadening codebook that potentially operates in the IF domain.

Figure 4:
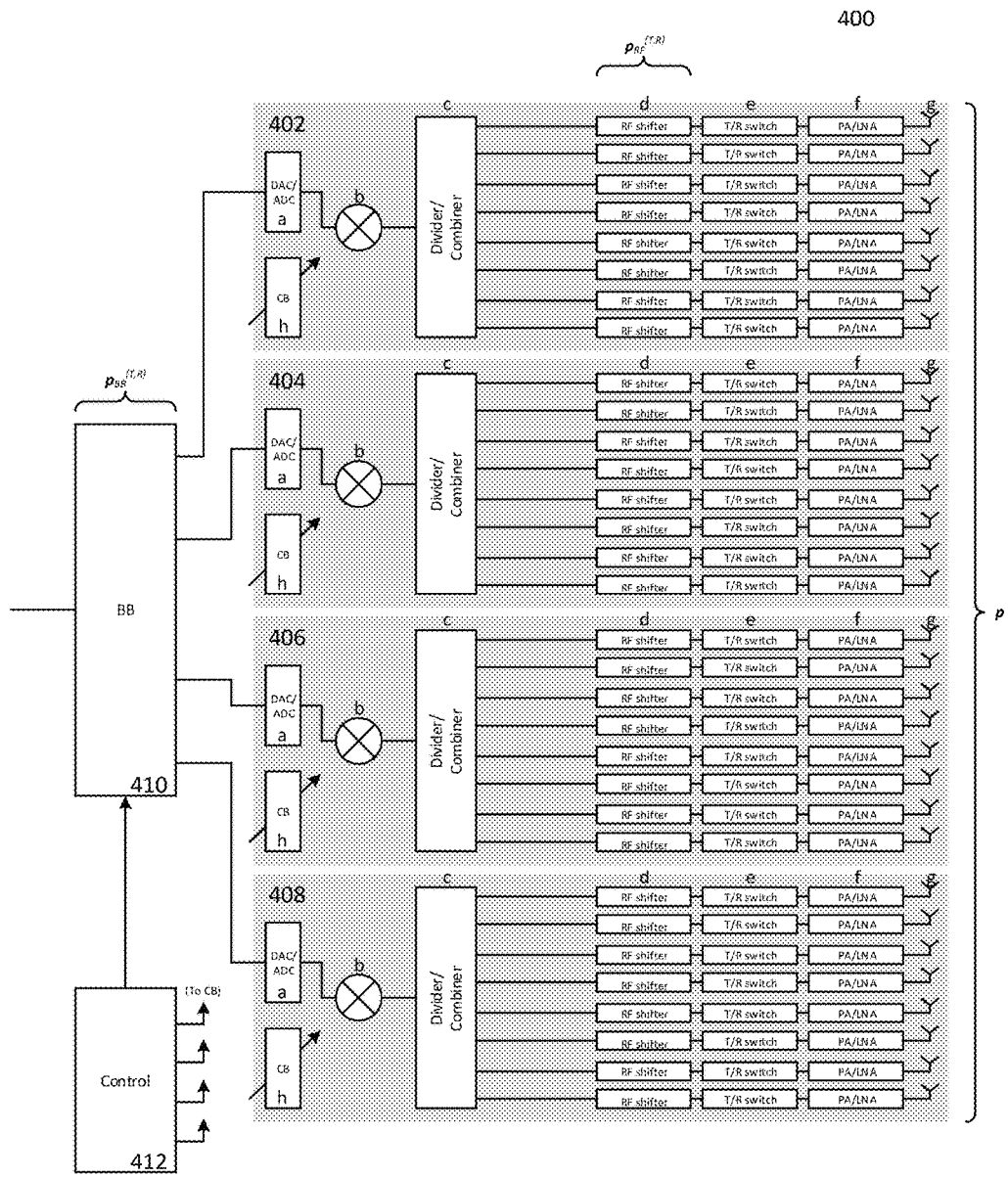
FIG. 4 shows a first modular beamforming architecture.
Figure 5:
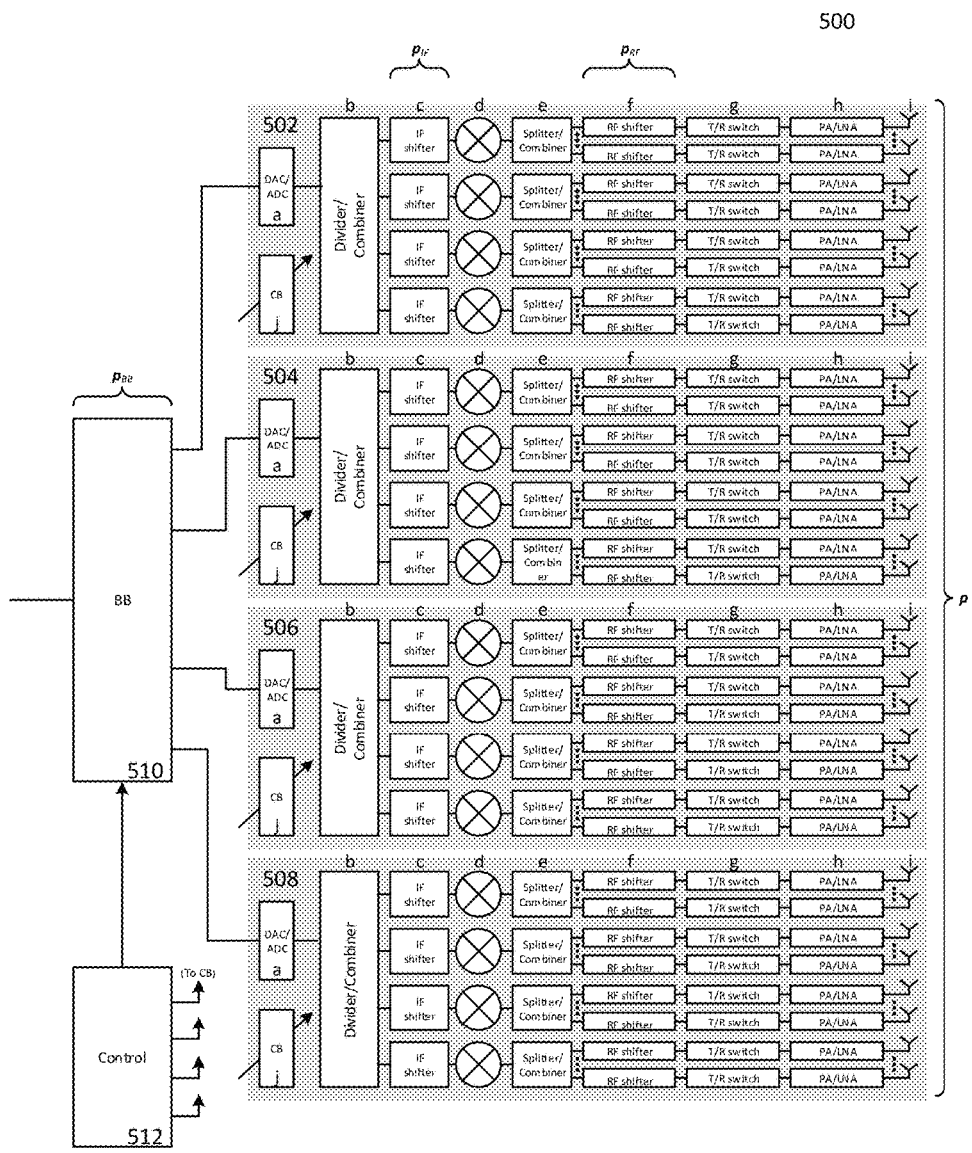
FIG. 5 shows a second modular beamforming architecture.

FIGS. 4 and 5 show a first and second implementation of the modular beamforming architecture introduced above. FIG. 4 shows modular beamformer 400, which may be configured to implement two-stage beamforming in the baseband and RF domain with four modules 402, 404, 406, and 408 (which are also RF chains). FIG. 5 shows modular beamformer 500, which may be configured to implement three-stage beamforming in the baseband, IF, and RF domains with four modules 502-508. As will be apparent to skilled persons, the number of RF chains, modules, antenna elements, etc., are scalable and may be changed without departing from the scope of this disclosure. Accordingly, the four RF chain/module architecture depicted in FIGS. 4 and 5 is exemplary and the associated descriptions and functionality may be scaled.

As shown in FIG. 4, modular beamformer 400 may include modules/RF chains 402, 404, 406, and 408 in addition to digital baseband beamformer 410 and control circuit 412. Each of modules RF chains 402-408 may include an Analog-to-Digital Converters/Digital-to-Analog Converters (ADC/DAC) 402a-408a, mixers 402b-408b, divider/combiner circuits 402c-408c, RF shifters 402d-408d, transmit/receive (T/R) switches 402e-408e, power amplifiers/low-noise amplifiers (PA/LNA) 402f-408f, antenna elements 402g-408g, and codebook circuits 402h-408h.

Each of RF chains 402-408 may form a 'beamforming module', which may each include a subset of L elements of antenna array 402g-408g that are configured to collectively form an antenna beam. As will be detailed, each of modules 402-408 may either be utilized to generate an individual beam (separate from other modules) or may be utilized to generate a combined beam through cooperative operation. Each of modules 402-408 may re-use the same optimized 'single module' codebook (i.e. contains only codewords of length L that specify beamforming weights for the L elements of any given single module), and may be able to both generate separate beams or combined beams while relying only on the single module codebook. Modular beamformer 400 may be able to dynamically adapt the antenna beams to form different numbers of steerable beams.

Modular beamformer 400 may operate in both the transmit and receive directions. Accordingly, in the transmit path digital baseband beamformer 410 may receive a transmit symbol s, apply digital beamforming weights to transmit symbol s according to baseband transmit beamforming vector $p_{BB}^t$, and provide the resulting weighted baseband symbols to each of RF chains/modules 402-408. Each of RF chains/modules 402-408 may then perform DAC with DACs/ADCs 402a-408a and mix the resulting analog baseband signal to an RF carrier frequency with mixers 402b-408b. Divider/combiner circuits 402c-408c may then split the analog RF signal into L different streams to provide to RF shifters 402d-408d. RF shifters 402d-408d may then each apply a respective beamforming weight to the analog RF signals according to RF transmit beamforming matrix $p_{RF}^t$ and provide the weighted RF signals to T/R switches 402e-408e, which may be switched to transmit in accordance with the transmit path. T/R switches 402e-408e may then pass the weighted RF signals to PAs/LNAs 402f-408f, which may perform RF power amplification and provide the amplified RF signals to antenna elements 402g-408g. Antenna elements 402g-408g may then transmit the amplified RF signals as wireless RF signals.

In the receive path, antenna elements 402g-408g may each receive and transduce wireless RF signals to provide the resulting received RF signals to PAs/LNAs 402f-408f. PAs/LNAs 402f-408f may perform low-noise amplification and provide the amplified RF signals to T/R switches 402e-408e, which may be switched to receive in accordance with the received path and accordingly may pass the amplified RF signals to RF shifters 402d-408d. RF shifters 402d-408d may each apply a respective beamforming weight according to RF receive beamforming matrix $p_{RF}^r$ and provide the resulting weighted RF signals to divider/combiner circuits 402c-408c. Divider/combiner circuits 402c-408c may then combine the received weighted RF signals, e.g. by summing the received weighted RF signals, and provide the combined RF signals to mixers 402b-408b which may mix the combined RF signals from RF to baseband frequencies. Mixers 402b-408b may then provide the resulting analog baseband signals to DACs/ADCs 402a-408a, which may perform ADC to produce digital baseband samples. DACs/ADCs 402a-408a may then provide the digital baseband samples to digital baseband beamformer 410, which may combine the received digital baseband samples according to the beamforming weights of baseband receive beamforming vector $p_{BB}^r$ to recover a baseband symbol s. Accordingly, while the following description may refer to a transmit context, it is appreciated that modular beamformer 400 may operate in either the transmit or receive directions according to the modular beamforming approach detailed herein.

Control circuit 412 may be responsible for controlling the beamforming settings of modular beamformer 400, which may include the number of beams, the modules assigned to each beam (i.e. for separate and collective beam cases), and the direction of each beam as defined by an assigned codeword for each of modules 402-408. As modular beamformer 400 may employ a two-stage beamforming approach in both the baseband and RF domains, control circuit 412 may be need to select both the baseband beamforming weights of $p_{BB}$ and the RF beamforming weights of $p_{RF}$ and indicate the selected weights to digital baseband beamformer 410 and RF shifters 402d-408d at each module 402-408. Depending on the use context, the baseband beamforming weights $p_{BB}$ may additionally be selected according to a digital precoding scheme, such as e.g. for a multi-layer case.

In order to calculate the baseband and RF beamforming weights, control circuit 412 may first identify the number of users, select an appropriate number of beams, assign modules 402-408 to a specific beam, and identify the desired direction of each beam. Depending on each of these factors, control circuit 412 may then calculate the appropriate baseband and RF beamforming weights of $p_{BB}$ and $p_{RF}$ and indicate the selection to digital baseband beamformer 410 and each of modules 402-408. Control circuit 412 may be structurally realized/embodied as hardware logic, e.g. as an integrated circuit or FPGA, as software logic, e.g. as a processor executing program code that defining arithmetic, control, and I/O instructions stored in a non-transitory computer-readable storage medium, or as a combination of hardware and software logic.

Digital baseband beamformer 410 may be realized as a digital processing circuit such as a microprocessor, and may receive the baseband beamforming weights $p_{BB}$ from control circuit 412 and apply $p_{BB}$ to a transmit symbol s ($p_{BB}{}'$ in the transmit direction, although the indices are dropped here for simplicity). Digital baseband beamformer 410 may not rely on a codebook, and instead may directly receive the beamforming weights $\alpha_i$, i=1, 2, . . . , $N_{RF}$ (with $N_{RF}$=4 in the exemplary architecture of FIG. 4) of $p_{BB}$ from control circuit 412. Digital baseband beamformer 410 may then apply $p_{BB}$ to s to yield $p_{BB}s=[\alpha_1 s\ \alpha_2 s\ \ldots\ \alpha_{N_{RF}} s]^T$. Although the following description may refer to control circuit 412 determining the digital baseband beamforming weights $p_{BB}$, digital baseband beamformer 410 may alternatively be configured to calculate the digital baseband beamforming weights $p_{BB}$ locally, such as e.g. to implement a digital precoding scheme.

Control circuit 412 may utilize a codebook-based approach in order to provide the appropriate beamforming weights to each of RF shifters 402d-408d. As shown in FIG. 4, each of modules 402-408 may include codebook circuits 402h-408h, which may each include a codebook memory storing a codebook. The codebooks stored at each of codebook circuits 402h-408h may be the same codebook, i.e. may contain the same codewords and corresponding beamforming weights. Although depicted separately in FIG. 4, codebook circuits 402h-408h may be implemented in a centralized manner, e.g. as a single codebook circuit with a single codebook memory that is connected to each of modules 402-408. In such a configuration, control circuit 412 may provide the selected codeword indices to the integrated codebook circuit, which may retrieve the corresponding codewords for each of modules 402-408 from the codebook memory and provide control signaling to RF shifters 402d-408d to apply the beamforming weights of the corresponding codewords. It is appreciated that both centralized and distributed codebook approaches are within the scope of this disclosure.

Each codebook may be a single-module codebook containing a plurality of codewords (each of length L corresponding to the L elements of a single module) that are each uniquely identified by a codeword index and are each composed of a plurality of beamforming weights. Each codeword may thus correspond to a different beam setting, as each codeword corresponds to a different set of beamforming weights that, when applied at the RF shifters of a given single module, will produce a specific beam pattern. For example, as detailed above regarding FIG. 3, each codeword V(θ) of the codebook may be composed of the optimized beamforming weights (either linear or non-linear) that, when applied by a given single module, will cause the module to produce a steerable beam in direction ϕ with θ=−kd sin(ϕ).

Accordingly, in the event that control circuit 412 aims to provide a directional beam from a given module, e.g. module 402, to a target point, control circuit 412 may estimate the angular direction ϕ' of the target point, identify a codeword V(θ) corresponding to a ϕ that most closely matches ϕ', and indicate the codeword index of the selected codeword V(θ) to codebook circuit 402h. Codebook circuit 402h may then access the codebook memory to retrieve the beamforming weights of V(θ) (where codeword V(θ) is a vector composed of the beamforming weights) and provide the beamforming weights to RF shifters 402d. RF shifters 402d may then each apply a respective beamforming weight of V(θ) to input signals and provide the resulting signals to antenna elements 402g via the rest of the transmit path. As a result of the effects of the beamforming weights on the phase and gain of each signal, the resulting wavefront of the signal emitted by antenna elements 402g will create a beam that is focused in angular direction ϕ corresponding to codeword V(θ).

The codebook may thus be pre-configured and subsequently pre-stored in each of codebook circuits 402h-408h. For example, as noted regarding FIG. 3 the optimized beamforming weights for different angular directions may be calculated during a pre-deployment codebook calculation stage. The number of codewords in the codebook may depend on the desired angular range and desired sensitivity. For example, in a sectorized antenna deployment scenario, antenna array 402g-408g may be targeted for deployment in a three-sector architecture where each sector corresponds to 120 degrees. If 1 degree resolution is desired, the codebook may consequently contain 120 different codewords, where the beamforming weights of each codeword may be optimized to form a steered beam at a respective different angular direction in a 120 degree range. Numerous additional variations and factors of the codebook may be adjusted and/or scaled without departing from the scope of this disclosure.

Each of modules 402-408 may therefore receive a codeword index from control circuit 412 and implement the beamforming weights of the specified codeword at RF shifters 402d-408d. Depending on the desired beamforming settings determined by control circuit 412, the codeword indices at each of modules 402-408 may be different. The effect of the beamforming weights applied by each of RF shifters 402d-408d may be characterized as RF beamforming matrix $p_{RF}$, which may be an N×$N_{RF}$ block diagonal matrix defined as $$p_{RF} = \begin{bmatrix} v_1 & \cdots & 0 \\ \vdots & \ddots & \vdots \\ 0 & \cdots & v_{N_{RF}} \end{bmatrix} \quad (1)$$

where each vector $v_i$, i=1, . . . $N_{RF}$ is the L×1 codeword V(θ) for the i-th module.

The overall effect of the digital and RF beamforming by $p_{BB}$ and $p_{RF}$ may thus be characterized as beamforming vector $p=p_{RF}p_{BB}$, where p is an N×1 vector that contains the combined baseband and RF beamforming weights at the output of each antenna element of antenna array 402g-408g. Accordingly, control circuit 412 may be configured to control each of modules 402-408 by selecting and specifying particular codewords for each of modules 402-408 to implement. Each of codebook circuits 402h-408h may store the same single-module codebook that contains optimized codewords for a single module.

Control circuit 412 may therefore be able to individually control each of modules 402-408 to each produce a beam pointing in a particular direction, which may be particularly useful in multi-user scenarios where multiple users are located in different directions. Control circuit 412 may thus operate modules 402-408 in a "primary phase shifting role" as modules 402-408 may provide the primary beam steering capabilities of modular beamformer 400. Control circuit 412 may operate digital baseband beamformer 410 in a "secondary phase shifting role", which may include directing digital baseband beamformer 410 to perform digital precoding and/or to provide secondary phase control to generate combined beams from multiple of modules 402-408.

Figure 6:
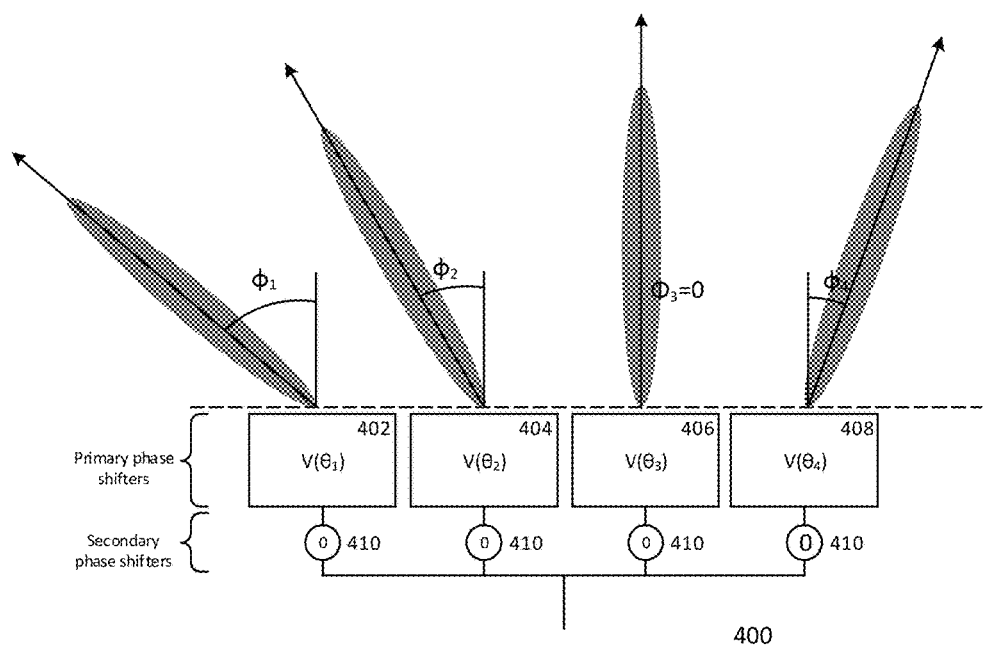
FIG. 6 shows a first exemplary operation mode of modular beamforming.

FIG. 6 shows an exemplary scenario in which modular beamformer 400 may employ each of modules 402-408 to steer a separate beam in a different direction. As shown in FIG. 6, modular beamformer 400 may produce beams steered in each of the $\phi_1$, $\phi_2$, $\phi_3$, and $\phi_4$ directions (each relative to the plane of antenna array 402g-408g). For example, control circuit 412 may identify four different users each located at angular directions of $\phi_1$, $\phi_2$, $\phi_3$, and $\phi_4$, respectively, from the antenna array plane. Control circuit 412 may thus determine that at least four separate beams are needed to serve all four users and may consequently assign each of modules 402-408 to produce a beam steered towards $\phi_1$, $\phi_2$, $\phi_3$, and $\phi_4$, respectively. It is noted that for a codebook of e.g. 120 degree range, the codebook may range from values of $-60 \leq \phi < 59$ (degrees) in reference to the orientation of $\phi$ as shown in FIG. 6.

As previously indicated, the codebook stored within codebook circuits 402h-408h may be preconfigured and may contain a plurality of codewords that are each optimized for steering a single module (L elements) in a particular direction $\phi$. Accordingly, control circuit 412 may identify a first codeword $V(\theta_1)$ from the codebook that matches $\phi_1$ (i.e. is preconfigured to generate a beam steered in angular direction $\phi_1$ as shown in FIG. 6), a second codeword $V(\theta_2)$ that matches $\phi_2$, a third codeword $V(\theta_3)$ that matches $\phi_3$, and a fourth codeword $V(\theta_4)$ that matches $\phi_4$. As detailed regarding FIG. 3, each codeword $V(\theta)$ may be e.g. a linearly progressive phase shifting codewords with progressive phase shift $\theta$ or a non-linearly progressive phase shifting codeword that are optimized to approximate a linearly progressive phase shifting codeword with progressive phase shift $\theta$.

Control circuit 412 may then indicate the selected codeword indices to each of modules 402-408 at codebook circuits 402h-408h via the control lines shown in FIG. 4 (which have been truncated in FIG. 4 for drawing clarity). Codebook circuits 402h-408h may then each respectively retrieve the first, second, third, and fourth codewords $V(\theta_1)$-$V(\theta_4)$ from the codebook memory according to the specified codeword indices and apply the beamforming weights corresponding to each codeword at respective RF phase shifters 402d-408d. As noted regarding Equation (1) above, the beamforming weights for the i-th module of modules 402-408 may be given as L×1 vector $v_i$ of $p_{RF}$ with $v_i = V(\theta_i)$. Accordingly, as shown in FIG. 6 such may produce a beam pattern composed of four separate beams each steered in angular directions $\phi_1$-$\phi_4$, respectively.

Control circuit 412 may additionally need to determine the baseband beamforming weights of $p_{BB}$ for application by digital baseband beamformer 410. As modular beamformer 400 may be operating with multiple users, the input to digital baseband beamformer 410 may be an $N_{layer} \times 1$ transmit symbol vector s (as opposed to the single transmit symbol s previously detailed), where s may be expressed as $$s = \begin{bmatrix} s_1 \\ \vdots \\ s_{N_{layer}} \end{bmatrix} \quad (2)$$

where $N_{layer}$ gives the number of layers, i.e. the number of transmit symbols being transmitted by modular beamformer 400 in parallel. For such a multi-layer case, baseband beamforming matrix $p_{BB}$ may be an $N_{RF} \times N_{layer}$ matrix for application to s as $p_{BB}s$, thus yielding an $N_{RF} \times 1$ vector for input to modules 402-408.

Digital baseband beamformer 410 may thus perform digital precoding on s with according to $p_{BB}$ to weight, combine, and map each of transmit symbols $s_i$, i=1, . . . , $N_{layer}$ to a respective one of modules 402-408. In a basic scenario, digital baseband beamformer 410 may simply map each transmit symbol $s_i$ to a respective one of modules 402-408, e.g. to transmit a first symbol $s_1$ to the first user located in direction $\phi_1$ a second symbol $s_2$ to the second user located in direction $\phi_2$, etc. Accordingly, digital baseband beamformer 410 may not perform any phase or gain beamforming and may simply provide each symbol $s_i$ to a respective module. Such is depicted in FIG. 6, where digital baseband beamformer 410 is depicted as applying no phase shift ("0", e.g. $\alpha_i = e^{j0} = 1$) to the input. Accordingly, control circuit 412 may direct digital baseband beamformer 410 to set $p_{BB} = [1 \ldots 1]^T$ in accordance with the secondary phase shifting role.

Alternatively, modular beamformer 400 may improve receiver performance by applying a more complex digital precoding technique at digital baseband beamformer 410. More specifically, despite the differences in steering angles $\phi_1$-$\phi_4$, a simple mapping of transmit symbols s to a respective module may result in excessive cross-talk and decreased receiver performance at the target users. Accordingly, digital baseband beamformer 410 may perform digital precoding with $p_{BB}$ in order to reduce cross-talk. The application of codewords $V(\theta_1)$-$V(\theta_4)$ by modules 402-408 may in effect create an "effective channel" seen at the digital port between digital baseband beamformer 410 and modules 402-408. Given a channel matrix H, the effective channel $H_{eff}$ may be expressed as $H_{eff} = p_{RF}H$. Utilizing a digital precoding technique such as zero-forcing precoding, digital baseband beamformer 410 may derive a digital precoding matrix $p_{BB}$ to apply that minimizes cross-talk and improves receiver performance. Digital baseband beamformer 410 may then apply $p_{BB}$ to s as $p_{BB}s$ and provide each of the $N_{RF}$ resulting elements to a respective one of modules 402-408 for RF beamforming according to respective codewords $V(\theta_1)$-$V(\theta_4)$. The determination of $p_{BB}$ for digital precoding may either be performed at digital baseband beamformer 410 or at control circuit 412; regardless, control circuit 412 may direct digital baseband beamformer 410 to perform digital precoding as part of the secondary phase shifting role.

Control circuit 412 may optionally perform further processing during selection of the codewords for each of modules 402-408 in order to optimize the generated beam pattern. For example, control circuit 412 may select the codewords such that each individual beam pattern has a null region in the directions of the other beam patterns. Such may reduce interference and more effectively support multi-user operation.

Control circuit 412 may continuously track the location of each target point (e.g. receiver or transmitter) in order to periodically adjust steering angles $\phi_1$-$\phi_4$ by selecting new codewords to provide to modules 402-408. Accordingly, modular beamformer 400 may dynamically adapt to user location over time. In order to both identify the directions $\phi_1$-$\phi_4$ of the user and to track user location, modular beamformer 400 may utilize a direction determination procedure such as a "sector sweep" procedure. In such sector sweep procedures, control circuit 412 may control modules 402-408 to incrementally steer across the steering range, e.g. from $-60 < \phi < 59$ (in degrees) and have target users report back measurements to control circuit 412 that indicate which ϕ was optimal. Control circuit 412 may thus be able to identify which steering direction ϕ to utilize for each user, and may periodically repeat the sector sweep procedure in order to continually track user location. Alternatively, assuming sufficient channel reciprocity, users may periodically transmit reference signals which modular beamformer 400 may receive at modules 402-408 and process at control circuit 412 to identify the optimal receive steering angle and subsequently utilize the optimal receive steering angle as the transmit steering angle. Such techniques are established and will be appreciated by skilled persons.

Accordingly, modular beamformer 400 may utilize the modular beamforming architecture to create multiple steered beams, while only utilizing a single-module steering codebook in the RF domain (where the same single-module steering codebook may be used at each codebook circuit in a distributed codebook architecture). Such may also be compatible with digital precoding techniques, as control circuit 412 may operate digital baseband beamformer 410 in the secondary phase shifting role to perform precoding based on the effective channel resulting from the RF beamforming of modules 402-408 in the primary phase shifting role.

Additionally, as previously indicated modular beamformer 400 may be able to adjust the number of antenna elements per beam, such as by using two or more of modules 402-408 to generate a combined beam with increased beamgain. Modular beamformer 400 may rely on the operation of digital baseband beamformer 410 in the secondary phase shifting role to generate such combined beams.

Combined beams may increase beamgain in a given steering direction ϕ as a result of the increased number of elements contributing to the beam. Such may be advantageous if modular beamformer 400 is communicating with less users than modules (e.g. communicating with less than four users with the four total modules of the exemplary configuration of FIG. 4) as modular beamformer 400 may utilize multiple modules to generate a single beam. As more elements per beam increases beamgain, it may be desirable for modular beamformer 400 to employ multiple modules per beam when possible.

However, such may conventionally require separate codebooks depending on the number of elements used per antenna beam, thus demanding a large codebook memory at codebook circuits 402h-402h to store each supported codebook. For example, while a given codeword V(θ) may be optimized for steering in direction ϕ with L elements, a completely different codeword V'(θ) may be needed to steer in direction ϕ with L'≠L, such as e.g. L'=2L; in other words, an optimized codeword for L elements may be completely different than an optimized codeword for 2L elements (two modules), 4L elements (four modules), etc., which may as a result call for multiple codebooks each optimized for a steering a different number of elements.

Figure 7:
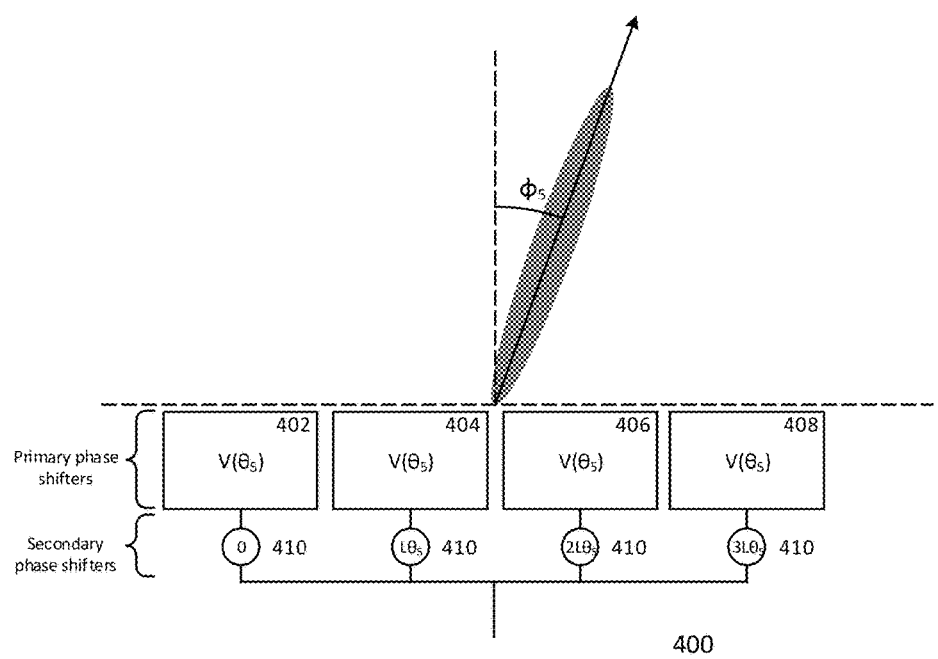
FIG. 7 shows a second exemplary operation mode of modular beamforming.

Instead, codebook circuits 402h-402h may each only store the single-module codebook that contains optimized codewords for single-module steering as shown in FIG. 7. In order to support a variable number of antenna elements per beam with only the single-module steering codebook, modular beamformer 400 may rely on the interaction between the primary phase shifters and secondary phase shifters, i.e. RF shifters 402d-408d and digital baseband beamformer 410, in order to control a variable number of beams produced by modules 402-408.

FIG. 7 shows an exemplary scenario in which modular beamformer 400 may utilize the same single-module codebook of FIG. 6 in order to generate a single beam in direction ϕ₅ from all of modules 402-408. As denoted in FIG. 7, control circuit 412 may set each of primary phase shifters/modules 402-408 to codeword $V(\theta_5)$ and set each i-th secondary phase shifter ($\alpha_1$-$\alpha_4$ of digital baseband beamformer 410 in a single-layer case, e.g. with $p_{BB}$ as an $N_{RF} \times 1$ vector) to have a phase of $(i-1)L\theta_5$, i.e. set $\alpha_1 = e^{j0} = 1$, $\alpha_2 = e^{jL\theta_5}$, $\alpha_3 = e^{j2L\theta_5}$, and $\alpha_4 = e^{j3L\theta_5}$. Baseband and RF beamforming vectors/matrices $p_{BB}$ and $p_{RF}$ may be mathematically expressed as $$p_{BB} = \begin{bmatrix} 1 \\ e^{jL\theta_5} \\ e^{j2L\theta_5} \\ e^{j3L\theta_5} \end{bmatrix} \quad (3)$$

$$p_{RF} = \begin{bmatrix} V(\theta_5) & \cdots & 0 \\ \vdots & \ddots & \vdots \\ 0 & \cdots & V(\theta_5) \end{bmatrix} \quad (4)$$

The combined beam produced by antenna array 402g-408g may thus be composed of individual beams from each antenna element, which may each combine to produce a single collective beam with maximum beamgain in direction ϕ₅. By setting each of primary phase shifters/modules 402-408 to codeword $V(\theta_5)$ and secondary phase shifters/digital baseband beamformer 410 to a linearly progressive phase shift of $L\theta_5$, modular beamformer 400 may in effect rely on the same principle of maximizing beamgain with linearly progressive phase shifted elements. Accordingly, as the relative phase difference between each neighboring module is $L\theta_5 = Lkd\sin(\phi_5)$ and each module is steered in direction ϕ₅ according to optimized codeword $V(\theta_5)$, the resulting combined beam shown in FIG. 7 may be steered in direction ϕ₅ with maximized beamgain.

Accordingly, modular beamformer 400 may employ the same optimized single-module codebook at each of modules 402-408 to generate a combined beam from multiple modules. Modular beamformer 400 may dynamically switch between the number of beams generated by modules 402-408 using the same single-module codebook. In order to transition between the multi-beam setting of FIG. 6 and the single-beam setting of FIG. 7, control circuit 412 may only need to select the appropriate codewords for primary phase shifters/modules 402-408 and the beamforming weights for secondary phase shifter/digital baseband beamformer 410 and provide the corresponding control signaling to codebook circuits 402h-408h and digital baseband beamformer 410. Such may thus allow control circuit 412 to dynamically adjust the beamforming setting for modular beamformer 400 over time without needing to rely on multiple codebooks.

In a slight modification, control circuit 412 may also direct digital baseband beamformer 410 to perform digital precoding instead of strictly relying on the Lθ phase separation. While the Lθ phase separation between modules 402-408 may be optimal in certain scenarios, digital baseband beamformer 410 may alternatively determine a different baseband beamforming vector $p_{BB}$ by applying a digital beamforming technique based on the effective channel $H_{eff}$ resulting from application of codeword $V(\theta_5)$ at each of modules 402-408. Such techniques may rely on feedback and/or sounding in order to derive an estimate of the effective channel $H_{eff}$ and subsequently determine a baseband beamforming vector $p_{BB}$.

Figure 8:
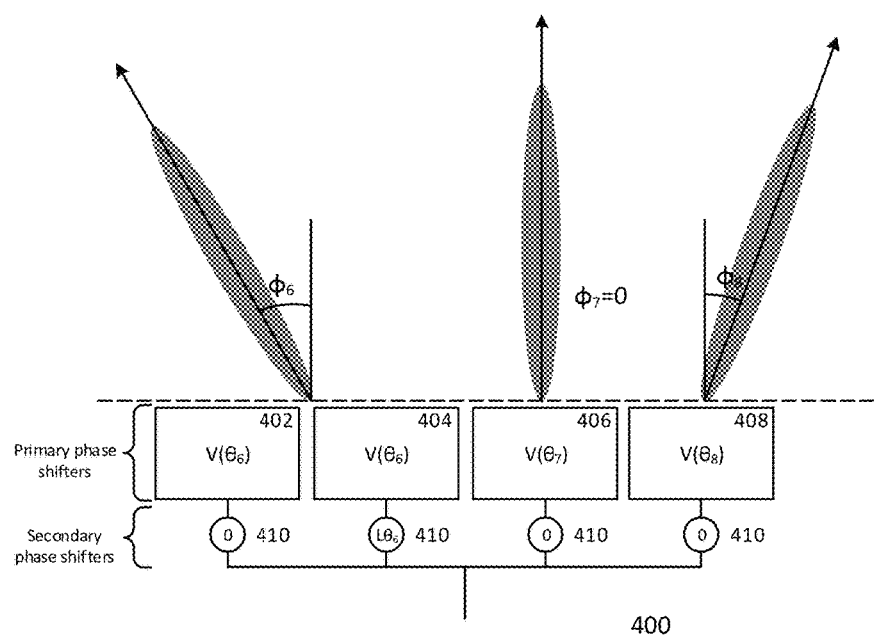
FIG. 8 shows a third exemplary operation mode of modular beamforming.

Numerous additional beamforming settings may be available to modular beamformer 400 that include different numbers of beams, directions of beams, elements per beam, etc. FIG. 8 shows another possible beamforming setting in which modular beamformer 400 may generate three beams from antenna array 402g-408g, with modules 402 and 404 producing a combined beam at angular direction $\phi_6$, module 406 producing a beam at angular direction $\phi_7$, and module 408 producing a beam at angular direction $\phi_8$. As denoted in the settings for primary phase shifters/modules 402-408 and secondary phase shifter/digital baseband beamformer 410, control circuit 412 may be responsible for selecting the codewords of $p_{RF}$ and the complex weights of $p_{BB}$ to realize the desired beamforming setting.

Specifically, in order to produce the combined beam at angular direction $\phi_6$ from modules 402 and 404, control circuit 412 may assign codeword $V(\phi_6)$ to both modules 402 and 404 by providing the codeword index of $V(\phi_6)$ to codebook circuits 402h and 404h, thus prompting codebook circuits 402h and 404h to each retrieve the beamforming weights for $V(\phi_6)$ from the codebook memory and apply the beamforming weights at RF shifters 402d and 404d. Likewise to as detailed regarding FIG. 7, control circuit 412 may need to set secondary phase shifters/digital baseband beamformer 410 to the appropriate phase shift values in order to maximize beamgain for the combined beam in direction $\phi_6$. Accordingly, control circuit 412 may instruct digital baseband beamformer 410 to set $\alpha_1=1$ and $\alpha_2=e^{j L \theta_6}$ in order to separate module 402 from module 404. by $\theta_6$ in phase.

As control circuit 412 may assign both modules 406 and 408 to produce separate beams steered in $\phi_7$ and $\phi_8$, respectively, control circuit 412 may assign a unity complex weight (i.e. of zero phase shift and unity gain) to digital baseband beamformer 410 for $\alpha_3$ and $\alpha_4$, i.e. $\alpha_3=1$ and $\alpha_4=1$. In order to assign modules 406 and 408 to steer in $\phi_7$ and $\phi_8$, respectively, control circuit 412 may identify codeword $V(\theta_7)$ for $\phi_7$ and codeword $V(\theta_8)$ for $\phi_8$ and provide the corresponding codeword indices to codebook circuits 406h and 408h, respectively. Codebook circuits 406h and 408h may then retrieve the corresponding beamforming weights of $V(\theta_7)$ and $V(\theta_8)$, respectively, and apply the beamforming weights at RF shifters 406d and 408d in order to produce the individual beams steered at $\phi_7$ and $\phi_8$ shown in FIG. 8.

Control circuit 412 may similarly adjust antenna array 402g-408g to form any number of varying beam patterns by adjusting the baseband beamforming weights of secondary phase shifters/digital beamformer 410 and the RF beamforming weights of primary phase shifters/modules 402-408. Each such configuration may re-use the same codebook optimized for steering a single module, thus reducing memory requirements at codebook circuits 402h-408h and simplifying control signaling compared to a conventional multi-module codebook.

As previously noted, the architecture of modular beamformer 400 shown in FIG. 4 may be scaled to any L, $N_{RF}$, N (where $N=LN_{RF}$), etc., according to the demonstrative descriptions included above. Accordingly, any number of beams formed by any number of antenna elements may be realized utilizing a modular architecture. Additionally, while the above description focused on using primary phase shifters/modules 402-408 and secondary phase shifters/digital beamformer 410 for phase shifting, it is appreciated that the beamforming weights of $p_{BB}$ and $p_{RF}$ may apply both phase shifts and gain factors in order to manipulate the antenna array beams.

As briefly introduced above, the modular beamforming architecture may be expanded as shown in FIG. 5 to have three-stage beamforming including baseband, IF, and RF beamforming. Modular beamformer 500 may employ many of the same components as modular beamformer 400, including four RF chains/modules 502-508 (with slight modifications, as detailed below), digital baseband beamformer 510, and control circuit 512. Each of modules 502-508 may include ADC/DACs 502a-508a, divider/combiner circuits 502b-508b, IF shifters 502c-508c, mixers 502d-508d, splitter/combiner circuits 502e-508e, RF shifters 502f-508f, T/R switches 502g-508g, PAs/LNAs 502h-508h, antenna elements 502i-508i, and codebook circuits 502j-508j.

Likewise to modular beamformer 400, modular beamformer 500 may operate with modules 502-508 as "primary phase shifters" each configured to form single or combined beams with a single-module codebook through collaboration with digital baseband beamformer 510 operating in a "secondary phase shifter" role. Modular beamformer 500 may additionally be able to operate the antenna elements connected to each of IF shifters 502c-508c as a sub-module; however, such will be detailed later.

As can be seen via comparison of FIGS. 4 and 5, each of modules 502-508 may feed the output path (in the transmit direction) of dividers/combiners 502b-508b to a respective one of IF shifters 502c-508c, after which the output signals may be mixed to the RF domain by mixers 502d-508d and subsequently split again by splitters/combiners 502e-508e before being fed to RF shifters 502f-508f. Accordingly, each of the $N_{RF}$ baseband outputs may be split into M input signals for the M IF shifters of each module before being split again into P=L/M input signals for the RF shifters of each module, where $N_{RF}$=4, M=4, P=4, L=16, and N=64 in the exemplary architecture of modular beamformer 500 shown in FIG. 5. As earlier noted, the architecture of modular beamformer 500 may be scalable.

The N×1 transmit beamforming vector p may be adapted to include the IF beamforming stage as $$p = p_{RF} p_{IF} p_{BB} \quad (5)$$

where $p_{BB}$ is an $N_{RF}$×1 vector (for a single-layer case), $p_{IF}$ is a $N_{RF}M \times N_{RF}$ matrix, and $p_{RF}$ is an $N \times N_{RF}M$ matrix where $N_{RF}M$ is the total number of IF shifters (M per RF chain). Accordingly, $p_{BB}$ may weight and map input symbol s to each of the $N_{RF}$ RF chains, $p_{IF}$ may weight and map the RF chain inputs to each of the $N_{RF}M$ IF shifters, and $p_{RF}$ may weight and map the IF shifter inputs to each of the N antenna elements.

RF beamforming matrix $p_{RF}$ may thus be a block diagonal matrix composed of vectors $v_{1:N_{RF}M}$, in the form $$p_{RF} = \begin{bmatrix} v_1 & \cdots & 0 \\ \vdots & \ddots & \vdots \\ 0 & \cdots & v_{N_{RF}M} \end{bmatrix} \quad (6)$$

where each vector v is a P×1 vector containing the RF beamforming weights of a given group of P RF shifters connected to the same IF shifter (where each of IF shifters 502c-508c feeds into P of RF shifters 502f-508f).

IF beamforming matrix $p_{IF}$ may be a block diagonal matrix composed of vectors $w_{1:N_{RF}}$ in the form $$p_{IF} = \begin{bmatrix} w_1 & \cdots & 0 \\ \vdots & \ddots & \vdots \\ 0 & \cdots & w_{N_{RF}} \end{bmatrix} \quad (7)$$

where each vector w is an M×1 vector that contains the IF beamforming weights of the M IF shifters of a given module (where each of modules 502-508 contains M of IF shifters 502c-508c).

Baseband beamforming matrix $p_{BB}$ may be of the same form as expressed above; namely an $N_{RF} \times 1$ vector for single layer operation in the form $$p_{BB} = \begin{bmatrix} \alpha_1 \\ \vdots \\ \alpha_{N_{RF}} \end{bmatrix} \quad (8)$$

or an $N_{RF} \times N_{layer}$ matrix for multi-layer operation as $$p_{BB} = \begin{bmatrix} \alpha_{1,1} & \cdots & \alpha_{1,N_{layer}} \\ \vdots & \ddots & \vdots \\ \alpha_{N_{RF},1} & \cdots & \alpha_{N_{RF},N_{layer}} \end{bmatrix} \quad (9)$$

Transmit beamforming vector p may be rewritten as $$p = \begin{bmatrix} p_1 \\ \vdots \\ p_{N_{RF}} \end{bmatrix} \quad (10)$$

where each $p_i$, $i=1, \ldots, N_{RF}$ is an $L \times 1$ vector given by $$p_i = \begin{bmatrix} v_{M(i-1)+1} & \cdots & 0 \\ \vdots & \ddots & \vdots \\ 0 & \cdots & v_{Mi} \end{bmatrix} w_i \alpha_i \quad (11)$$

$$= M_i w_i \alpha_i$$

where the RF beamforming weights $v_{M(i-1)+1:Mi}$ are the L RF beamforming weights of the RF shifters of the i-th module (where each v contains P RF beamforming weights).

Each of IF shifters 502c-508c may be analog phase shifters (and may additionally have a gain component), and accordingly may have higher resolution than RF shifters 502f-508f, e.g. 1 degree resolution. Control circuit 512 may control each of IF shifters 502c-508c according to a codebook, such as e.g. either a steering codebook in conjunction with RF shifters 508c-508f or a broadening codebook to control beam broadening.

The addition of IF shifters 502c-508c may allow modular beamformer 500 to adjust the IF beamforming weights of each of IF beamforming vectors $w_{1:N_{RF}}$ of $p_{IF}$, which may grant modular beamformer 500 greater control over the available beamforming settings. In particular, modular beamformer 500 may utilize IF beamforming vectors w in order to support a more optimized codebook (by utilizing both IF and RF beamforming for each codeword) or to provide beam broadening functionality.

In terms of supporting an optimized codebook, the inclusion of IF shifters 502c-508c may enable modular beamformer 500 to utilize codewords $V(\theta)$ that utilize both RF and IF beamforming. As each of modules 502-508 contains L RF shifters and M IF shifters, modular beamformer 500 may utilize codewords $V(\theta)$ that are composed of L RF beamforming weights ($v_{M(i-1)+1:Mi}$) and M IF beamforming weights ($w_1$); in other words, each codeword $V(\theta)$ used for steering may specify the beamforming weights for each of the L RF shifters and each of the M IF shifters.

Modular beamformer 500 may therefore be able to utilize codewords with improved steering sensitivity (albeit at the cost of increased memory storage and control signaling overhead). For example, for quantization in linearly progressive phase shifted codewords the inclusion of IF shifters 502c-508c may allow every P (number of RF shifters fed by an IF shifter) RF inputs to be modified by an IF beamforming weight; accordingly, such may allow the IF phase shift values to be selected such that the corresponding RF phase shifters 'inherit' a phase shift that will allow the combined RF and IF phase shifts to more closely align with the desired θ phase separation between each element. Additionally, in a non-linear optimized codeword approach, the values of both the RF beamforming weights of $p_{RF}$ and the IF beamforming weights of $p_{IF}$ may be adjusted in order to determine an optimized codeword composed of both an L RF beamforming weights ($v_{M(i-1)+1:Mi}$) and M IF beamforming weights ($w_i$). Accordingly, the beamgain modeling function $F(\beta, \rho, \phi)$ may additionally include an IF weight vector p as an input and may be solved for $$\underset{\beta,\rho}{\mathrm{argmax}}\, F(\beta, \rho, \phi)$$

to determine an optimized codeword $V(\theta)$ composed of both β ($v_{M(i-1)+1:Mi}$) and ρ ($w_i$), i.e. both L RF beamforming weights and M IF beamforming weights. Depending on the desired steering direction of each module, control circuit 512 may thus assign an individual codeword $V(\theta)$ to each of modules 502-508, which each of codebook circuits 502j-508j may respectively retrieve from the codebook memory and apply at IF shifters 502c-508c and RF shifters 502f-508f. Accordingly, as opposed to the L-element codewords of modular beamformer 400, modular beamformer 500 may employ L+M-element codewords $V(\theta)$ to support both RF and IF beamforming.

Modular beamformer 500 may provide multiple beam support in a similar manner as detailed above regarding modular beamformer 400. For example, in order to support e.g. four separate users located at each of directions $\phi_1$, $\phi_2$, $\phi_3$, and $\phi_4$ relative to antenna array 502h-508h, control circuit 512 may identify each of $\phi_1$, $\phi_2$, $\phi_3$, and $\phi_4$ and respectively assign corresponding codewords $V(\theta_1)$, $V(\theta_2)$, $V(\theta_3)$, and $V(\theta_4)$ to codebook circuits 502j-508j. As previously noted, each of codewords $V(\theta_1)$-$V(\theta_4)$ may either be linearly progressive phase shifted codewords or optimized non-linear codewords that are composed of M+L beamforming weights and each are tailored to steer modules 502-508 in a respective one of $\phi_1$-$\phi_4$. Control circuit 512 may additionally employ digital precoding via control of digital baseband beamformer 510, which may derive $p_{BB}$ based on the effective channel $H_{eff}$ according to a digital precoding scheme such as zero-forcing precoding.

Modular beamformer 500 may generate combined antenna beams with two or more of modules 502-508 in the same manner as modular beamformer 400, i.e. by employing digital baseband beamformer 510 in a secondary phase shifter role. Analogous to as detailed in FIGS. 7 and 8, in order to produce a beam in a given direction φ control circuit 512 may assign multiple of modules 502-508 with the same codeword $V(\theta)$ (thus specifying the same RF beamforming weights $v_{M(i-1)+1:Mi}$ and IF beamforming weights $w_i$) and assign digital baseband beamformer 510 with baseband beamforming weights of $p_{BB}$ separated by Lθ for the selected modules. Accordingly, in the same manner as to modular beamformer 400, modular beamformer 500 may produce a combined beam with multiple of modules 502-508 with maximum beamgain in a given direction ϕ while employing only a single-module codebook for steering.

Modular beamformer 500 may alternatively utilize IF shifters 502c-508c to perform the secondary phase shifting role in producing combined beams. As IF shifters 502c-508c may be utilized for implementation of IF-stage beamforming in each codeword V(θ), it may be more straightforward to rely on digital baseband beamformer 510 to assume the secondary phase shifting role and keep IF shifters 502c-508c in the primary phase shifting role (along with RF shifters 502f-508f). However, as combined beam functionality requires phase separation of Lθ between the involved modules, modular beamformer 500 may be able to utilize IF shifters 502c-508c in the secondary phase shifting role. For example, instead of utilizing the baseband beamforming weights α of $p_{BB}$ to produce the requisite Lθ phase separation between modules of the combined beam, control circuit 512 may realize the Lθ phase separation by assigning IF beamforming weights $w_i$ to each of modules 502-508 that are separated by Lθ. For example, in an implementation where each of IF shifters 502c-508c is assigned an IF beamforming weight as part of a given codeword V(θ) (e.g. to realize a combined beam collectively from each of modules 502-508), control circuit 512 may add a phase shift of Lθ to the beamforming weights of each of IF shifters 504c (e.g. add Lθ to the phase of each element of $w_2$, e.g. $w_2 e^{jL\theta}$), a phase shift of 2Lθ to the beamforming weights of each of IF shifters 506c (e.g. $w_3$), and a phase shift of 3Lθ to the beamforming weights of each of IF shifters 508c (e.g. $w_4$), thus creating an Lθ phase separation between modules 502-508.

Such may be difficult if control circuit 512 is constrained to codewords of the single-module codebook to control IF shifters 502c-508c. Accordingly, in alternate implementations using IF shifters 502c-508c in a secondary phase shifter role, modular beamformer 500 may utilize a codebook-based approach to control RF phase shifters 502f-508f (in a primary phase shifter role) and a direct-control approach (i.e. without a codebook) to control IF shifters 502c-508c. In a direct-control approach, control circuit 512 may directly specify the values for each of IF shifters 502c-508c, e.g. with B-bit digital control lines. As such may increase control signaling overhead, it may be advantageous to implement combined beams with digital baseband beamformer 510 assuming the secondary phase shifter role to enforce the Lθ phase separation; however, both implementations are within the scope of this disclosure.

Figure 9:
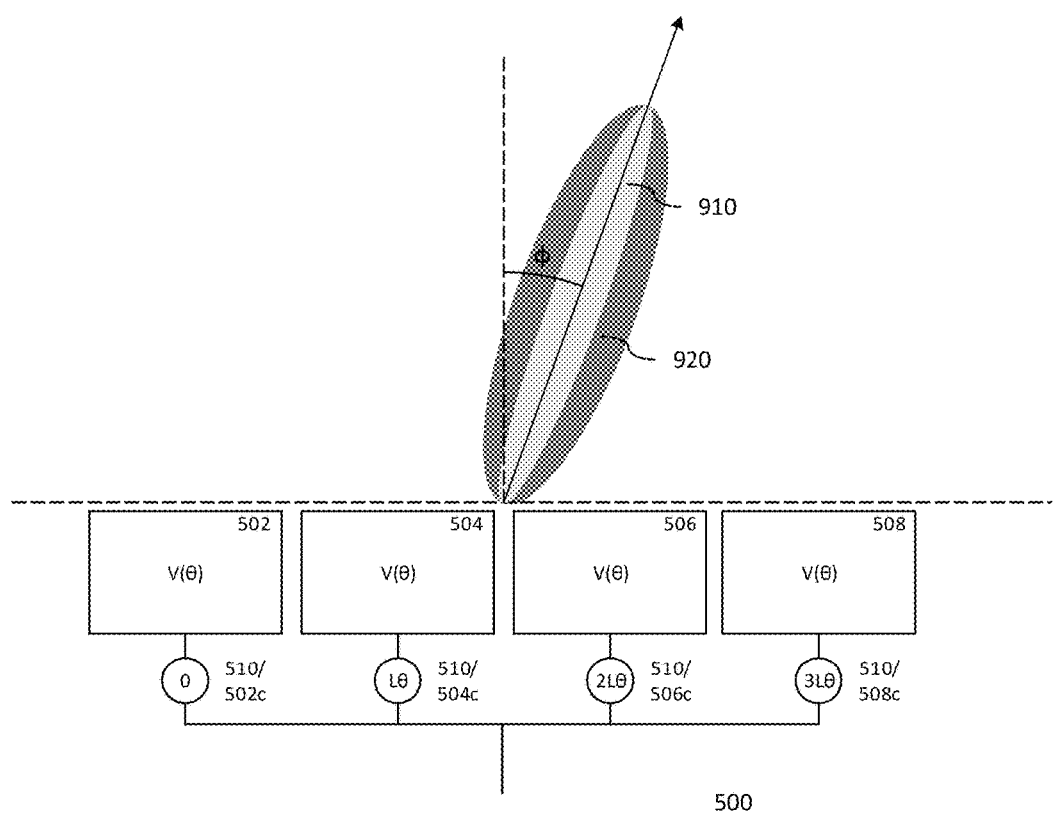
FIG. 9 shows a fourth exemplary operation mode of modular beamforming.

Alternatively to employing IF shifters 502c-508c for steering codewords, modular beamformer 500 may utilize IF shifters 502c-508c to implement beam broadening. Modular beamformer 500 may "broaden" an antenna beam in order to cover a larger area, such as in order to target users whose locations can not be reliably estimated or for sector sweep procedures. FIG. 9 shows an exemplary illustration of such beam broadening in which modular beamformer 500 may apply beam broadening techniques to broaden beam 910 to obtain beam 920. As previously noted, generating a combined beam from multiple modules may provide greater beamgain in the steered direction ϕ. However, the combined beam resulting from cooperation by multiple modules, e.g. beam 910, may be substantially narrower than a beam generated from a single module. The breadth of a beam, i.e. "beamwidth", may be quantitatively measured by half-power beamwidth (HPBW), which is the angular separation in which the magnitude of an antenna radiation pattern decreases by half, i.e. 50% or 3 dB. The HPBW of antenna arrays may be inversely proportional to the number of antenna elements; in other words, the HPBW of an antenna array may decrease (i.e. the beam may become narrower) as the number of elements of the array increases. For example, a uniform linear array with 2L elements may have an HPBW that is half as broad as a uniform liner array with L elements. As a result, combined beams generated by modular beamformer 500 with multiple modules may be narrower, i.e. have smaller HPBW, than beams generated by a single module. While narrow beams may be desirable in certain cases, such as for minimizing interference between different users, excessively narrow beams may require a high degree of directional accuracy and may be susceptible to sudden user movement and/or imprecise user location determination.

Accordingly, modular beamformer 500 may be configured to implement beam broadening techniques to broaden antenna beams. While beam broadening may be particularly applicable for combined beams due to the associated reduced HPBW, modular beamformer 500 may also employ beam broadening for single module beams. As will be detailed, modular beamformer 500 may be able to employ different techniques for beam broadening.

In a first beam broadening technique, modular beamformer 500 may broaden a beam generated by one or more of modules 502-508 by creating a phase distribution across the corresponding antenna elements according to a predefined phase distribution pattern. As previously indicated, modular beamformer 500 may apply such a phase distribution by manipulating the phases of the beamforming weights $w_i$ of IF shifters 502c-508c; however, modular beamformer 500 may alternatively apply the phase distribution by manipulating the beamforming weights $v_{M(i-1)+1:Mi}$ of RF shifters 502f-508f.

For example, an exemplary predefined beam broadening pattern is provided in equation (12). An antenna array beam may be broadened by applying a phase distribution γ(n) to each n-th element of the antenna array, i.e. separating the phase of each antenna according to γ(n), where γ(n) is given as $$\gamma(n) = 4\pi c \left| \frac{1}{2(N'-1)} + \frac{\left(n - \frac{N'}{2} - 1\right)}{N'-1} \right|^p \quad (12)$$

for n=1, ..., N', where N' is the number of elements in the array, c is a design variable that defines the value of the broadening and p is a constant which allows for adjustment of side lobes and possible adjustment of the main lobe. While γ(n) of Equation (12) may be referred to in the following description, broadening phase distributions based on other γ(n) may be analogously applied.

Accordingly, in an optimal scenario where modular beamformer 500 has direct control over the beamforming weights of RF shifters 502f-508f (e.g. a non-codebook-based approach), control circuit 512 may calculate γ(n) for the N' elements of a given antenna beam (e.g. N'=L for a single beam, N'=2L for a combined beam from two modules, etc.) and each add γ(n) to the phase of the beamforming weight n-th RF shifter of RF shifters 502f-508f (e.g. by multiplying each n-th RF beamforming weight by $e^{j\gamma(n)}$), thus creating the phase distribution γ(n) over the N' elements. As a result, the corresponding beam may be broadened according to broadening factor c, e.g. as shown in FIG. 9 for beams 910 and 920. In the context of FIG. 9 with all four of modules 502-508 cooperating to form beam 920, control circuit 512 may add γ(1) to γ(L) to the phase of beamforming weights $v_{1:M}$ of RF shifters 502f (where each of $v_{1:M}$ is a P×1 vector, thus yielding PM=L beamforming weights for respective summation with γ(1) to γ(L)), γ(L+1) to γ(2L) to the phase of beamforming weights $v_{M+1:2M}$ of RF shifters 504f, γ(2L+1) to γ(3L) to the phase of beamforming weights $v_{2M+1:3M}$ of RF shifters 506f, and γ(3L+1) to γ(4L) to the phase of beamforming weights $v_{3M+1:4M}$ of RF shifters 508f. Although detailed here regarding modular beamformer 500, modular beamformer 400 may also be able to apply such beam broadening with RF shifters 402d-408d by applying a phase distribution over the N RF shifters 402d-408d; alternatively, both modular beamformer 400 and 500 may be able to perform broadening with digital baseband beamformer 410 and 510, respectively, by generating a phase distribution across the $N_{RF}$ baseband outputs.

Creating the phase distribution γ(n) with RF shifters 502f-508f may require that control circuit 512 be able to directly add a respective γ(n) to the RF beamforming weight of each of RF shifters 502f-508f. Such may require direct control over the beamforming weights of RF shifters 502f-508f, which may not conform with the codebook-based control approach as detailed above for generating steerable beams.

Accordingly, modular beamformer 500 may instead separate the steering functionality from the broadening functionality by assigning RF shifters 502f-508f to perform steering and IF shifters 502c-508c to perform broadening. Control circuit 512 may therefore control RF shifters 502f-508f with a steering codebook while separately controlling IF shifters 502c-508c with a broadening codebook.

The steering codebook may contain RF-only codewords V(θ) (corresponding to $v_{M(i-1)+1:Mi}$) and that may function in the same manner as previously detailed. Accordingly, control circuit 512 may assign a steering codeword V(θ) to each of respective modules 502-508 in a primary phase shifting role and utilize digital baseband beamformer 510 in a secondary phase shifting role to create single or combined steerable beams. In the event that control circuit 512 decides to broaden a given beam (either single or combined), control circuit 512 may select broadening codewords D(c) for the corresponding IF shifters (i.e. the IF shifters associated with the given beam/part of the modules assigned to the given beam) from the broadening codebook and assign the selected broadening codewords D(c) to the corresponding IF shifters via the associated codebook circuits.

Accordingly, codebook circuits 502j-508j may each contain the steering codebook containing steering codewords V(θ) and the broadening codebook containing broadening codewords D(c). Each of the broadening codewords D(c) may be preconfigured to produce a beam broadening effect according to broadening factor c, where larger values of c may create broadened beams with greater HPBW. Equation (12) may be expressed for the IF-based broadening context (as opposed to the RF-based broadening) as $$\gamma(m) = 4\pi c \left| \frac{1}{2(M'-1)} + \frac{\left(m - \frac{M'}{2} - 1\right)}{M'-1} \right|^p \qquad (13)$$

for m=1, ..., M', where M' gives the number of IF shifters associated with the beam targeted for broadening. For example, a two-module combined beam may yield M'=2M, thus requiring the phase distribution γ(m) to be applied across the 2M total IF shifters of both modules.

In order to perform beam broadening for a given beam with M' IF shifters, modular beamformer 512 may need to create phase distribution γ(m) across the M' IF shifters, i.e. by applying phase distribution γ(m) to the IF beamforming weights $w_i$ of the involved modules. As phase distribution γ(m) depends on M', γ(m) may vary depending on the number of IF shifters associated with the beam targeted for broadening, i.e. the number of modules assigned to the target beam. Accordingly, modular beamformer 500 may need to utilize multiple broadening codebooks (compared to the single steering codebook), where each broadening codebook contains broadening codewords D(c) for a different M'. For example, modular beamformer 500 may need to employ different broadening codebooks, i.e. a first broadening codebook for a single beam from a single module (M'=L), a second broadening codebook for a combined beam from two modules (M'=2L), etc. Accordingly, depending on the number of modules assigned to the beam that control circuit 512 aims to broaden, control circuit 512 may select broadening codewords D(c) from the appropriate broadening codebook.

Each of the broadening codewords D(c) of a given broadening codebook may provide a different degree of broadening. For example, a first broadening codebook may contain e.g. 4 different codewords $D(c_1)$, $D(c_2)$, $D(c_3)$, and $D(c_4)$, where $D(c_1)$ provides broadening according to a first broadening factor $c_1$, $D(c_2)$ provides broadening according to a second broadening factor $c_2$, etc. Each broadening codebook may similarly contain multiple different broadening codewords D(c) (where each broadening codebook may contain the same or a different number of broadening codewords D(c)). Accordingly, in order to perform broadening for a given beam, control circuit 512 may identify the appropriate broadening codebook based on the number of modules assigned to the target beam and select a broadening codeword D(c) that provides a desired degree of broadening. Control circuit 512 may then specify the selected broadening codeword D(c) to the codebook circuits of the appropriate modules (the modules assigned to the target beam), which may retrieve the broadening weights corresponding to D(c) and apply the broadening weights at the corresponding IF shifters as the IF beamforming weights $w_i$ of the involved modules. As noted above, codebook circuits 502j-508j may either be distributed (one per module, e.g. as shown in FIG. 5) or centralized, i.e. a single codebook circuit connected to all of modules 502-508. As the broadening phase distribution γ(m) may apply to IF shifters of more than one module, a centralized codebook circuit may be better suited to the broadening approach; however, both implementations are within the scope of this disclosure.

In the exemplary context of FIG. 9, control circuit 512 may broaden beam 910 that is collectively generated by all of modules 502-508 to obtain beam 920. Control circuit 910 may steer beam 920 in direction ϕ by assigning the same codeword V(θ) to each of modules 502-508 in a primary phase shifting role and creating an Lθ phase separation with digital baseband beamformer 512 in a secondary phase shifting role. In order to perform broadening, control circuit 512 may identify that all four of modules 502-508 are assigned to beam 920, and accordingly may utilize a broadening codebook for phase distribution γ(m) with M'=4M, i.e. the total number of IF shifters in modules 502-508.

Control circuit 512 may then identify the desired broadening factor c and select a corresponding codeword D(c) from the broadening codebook. Similarly as to detailed above regarding codeword-based steering approaches, control circuit 512 may identify the appropriate codeword index for the selected codeword D(c) and indicate the codeword index to codebook circuits 502j-508j, which may access the codeword memory and retrieve the beamforming weights corresponding to D(c). Codebook circuits 502j-508j may then apply the beamforming weights for D(c) as the IF beamforming weights $w_{1-4}$ at IF shifters 502c-508c in order to create the phase distribution γ(m) associated with D(c), thus resulting in broadened beam 920. More specifically, codebook circuit 502j may assign γ(1) to γ(M) to IF shifters 502c (e.g. set $w_1=[e^{j\gamma(1)} \ldots e^{j\gamma(M)}]$), codebook circuit 504j may assign γ(M+1) to γ(2M) to IF shifters 502c (e.g. set $w_2=[e^{j\gamma(M+1)} \ldots e^{j\gamma(2M)}]$), codebook circuit 506j may assign γ(2M+1) to γ(3M) to IF shifters 506c (e.g. set $w_3=[e^{j\gamma(2M+1)} \ldots e^{j\gamma(3M)}]$), and codebook circuit 508j may assign γ(3M+1) to γ(4M) to IF shifters 508c (e.g. set $w_4=[e^{j\gamma(3M+1)} \ldots e^{j\gamma(4M)}]$). As noted above, codebook circuits 502j-508j may be realized as a centralized codebook circuit connected to each of modules 502-508. In such an implementation, each codeword D(c) may be composed of M' elements (depending on the corresponding broadening codebook), which control circuit 512 may indicate to the centralized control circuit. The centralized control circuit may then retrieve D(c) from the broadening codebook memory and apply the broadening weights of D(c) to the M' IF shifters. As each broadening codeword D(c) is intended to create phase distribution γ(m) across the M' associated IF shifters, each broadening codeword D(c) may be composed of M' elements where each m-th element is given as $e^{j\gamma(m)}$. Both centralized and distributed codebook circuits are within the scope of this disclosure. Although detailed above as a phase-only approach, e.g. by setting elements of IF beamforming weights $w_i$ to $e^{j\gamma(m)}$, modular beamformer 500 may alternatively utilize both a phase and gain approach to perform beam broadening.

Accordingly, modular beamformer 500 may utilize the first beam broadening technique to broaden beams for varying numbers of modules by creating a broadening phase distribution γ(m) across the M' IF shifters of the modules associated with the beams. As detailed above, control circuit 512 may maintain use of the single-module codebook containing optimized codeword V(θ) (linear or non-linear RF codewords) for steering while also employing one or more broadening codebooks composed of broadening codewords D(c), where each broadening codebook corresponds to a specific number of IF shifters participating in the beam broadening and each broadening codeword D(c) provides a different degree of broadening according to broadening factor c.

The broadening factors for the codewords of each of the broadening codebooks may be preconfigured based on the number of modules associated with each broadening codebook. As noted above, the HPBW of a given antenna beam is inversely proportional to the number of antenna elements that contribute to the antenna beam; accordingly, antenna beams formed by large numbers of modules may produce narrower beams. As a result, broadening codebooks associated with larger numbers of modules (i.e. large M', e.g. four or more modules) may be preconfigured to contain broadening codewords D(c) with larger broadening factors than broadening codebooks with smaller numbers of modules. For example, the broadening codewords D(c) in the broadening codebook for four modules (M=4L) may have higher broadening factors c than the broadening codewords D(c) in the broadening codebook for two or less modules. Furthermore, modular beamformer 500 may only utilize beam broadening for beams generated by higher numbers of modules, e.g. four or more, as only beams generated by higher numbers of modules may be narrow enough to warrant beam broadening.

Modular beamformer 500 may implement the first beam broadening approach on a given beam independently of the steering direction ϕ of the beam, such as by separating the steering and broadening functionality between RF shifters 502f-508f and IF shifters 502c-508c, respectively. As detailed above, such may allow modular beamformer 500 to perform each of multi-beam, combined beam, and broadening with only a single-module steering codebook and one or more broadening codebooks. Additionally, modular beamformer 500 may be configured to perform beam broadening dependent on the steering direction ϕ. For example, as previously noted antenna array 502i-508i may be deployed as part of a sectorized antenna architecture where antenna array 502i-508i may be assigned to an e.g. 120 degree area of a base station. Accordingly, the steering directions ϕ may range from e.g. −60 to 59 degrees. As such beams are located near the edges of the steering range, modular beamformer 500 may not need to broaden beams that are steered in directions close to −60 or 59 degrees as much as beams that are relative central to the steering range.

FIG. 10 shows table 1000 detailing an exemplary broadening codebook configuration for an implementation with 8 RF chains/modules in which modular beamformer 500 may perform broadening dependent on the number of modules associated with a target beam and the steering direction ϕ of the target beam. The entries of table 1000 are the broadening factors c with p=2 in the phase distribution γ(m) of Equation (13), where as previously detailed larger values of c produced broader beams (higher HPBW) than smaller values of c. As shown in table 1000, modular beamformer 500 may not perform any beam broadening for beams created by either one or two modules. Accordingly, control circuit 512 may either not assign a broadening codeword D(c) to the IF shifters or may assign a default "null" broadening codeword D(c=0) that does not produce any broadening.

Conversely, modular beamformer 500 may perform beam broadening for beams produced by either four or eight modules. As beams produced by eight modules may be narrower than beams produced by four modules (e.g. 50% of the HPBW due to twice the number of antenna elements), control circuit 512 may select broadening codewords D(c) with higher broadening factors c for eight module beams than four module beams. Additionally, control circuit 512 may select broadening codewords D(c) with higher broadening factors c for beams with steering direction ϕ in the center of the steering range than for beams with steering directions towards the edges of the steering range.

In the exemplary scenario of table 1000, the broadening codebook memory of codebook circuits 502j-508j may only need to hold two broadening codebooks: a first broadening codebook for broadening codewords D(c) for four-module beams and a second broadening codebook for broadening codewords D(c) for eight-module beams. As can be seen from the broadening factors c shown in table 1000, the first broadening codebook may contain e.g. four different broadening codewords in D(c=0.3), D(c=0.4), D(c=0.5), and D(c=0.8) (all corresponding to γ(m) with M'=4L), while the second broadening codebook may contain e.g. four different broadening codewords in D(c=0.8), D(c=0.9), D(c=1.0), and D(c=1.2) (all corresponding to γ(m) with M'=8L). Accordingly, both broadening codebooks may include in total 8 broadening codewords D(c) for each of IF shifters 502c-508c. Depending on the desired precision, each of the broadening codewords D(c) may utilize a different number of bits, such as e.g. 12 bits per broadening codeword D(c).

Control circuit 512 may thus function according to control logic similar to that underlying table 1000. For example, control circuit 512 may perform beam broadening for any antenna beam that is produced by e.g. four or more modules, where control circuit 512 may select the specific degree of broadening based on the number of modules per beam and the steering direction $\phi$ of the beam. Accordingly, control circuit 512 may identify the number of modules used for a given beam, the steering direction $\phi$ for the beam, and subsequently select the appropriate broadening codeword D(c) according to a particular broadening criteria. Control circuit 512 may then indicate the selection to the appropriate codebook circuits, which may enact beam broadening on the beam according to the specified codeword D(c) with the corresponding IF shifters.

Control circuit 512 may optionally consider additional criteria in determining whether to perform beam broadening on a given beam and/or the degree of beam broadening to perform. For example, during multi-beam operation, control circuit 512 may need to compare the steering directions $\phi$ of each beam in order to ensure that beam broadening would not create interference between the beams. Additionally, control circuit 512 may decide to perform beam broadening if a target move is moving quickly and/or unpredictably in order to compensate for potential inaccuracy in determining the location of the target.

Figure 11:
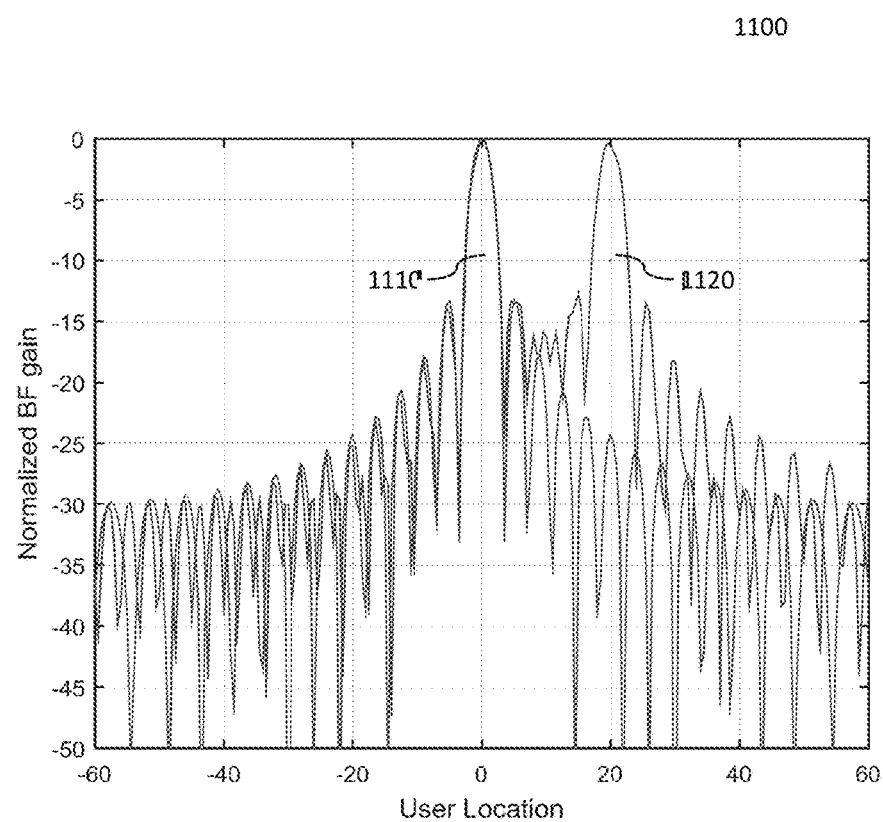
FIG. 11 shows a chart detailing a second beam broadening technique.

As noted above, modular beamformer 500 may be able to perform beam broadening according to multiple beam broadening techniques including the first beamforming technique. In a second beamforming technique, modular beamformer 500 may be configured to create broader beams by creating a first steered beam with a main lobe and a null and simultaneously creating a second steered beam with a main lobe in the null of the first steered beam and a null that falls in the main lobe of the first beam. FIG. 11 shows an exemplary depiction in chart 1100 in which control circuit 512 may select a first codeword $V(\theta_1)$ to steer beam 1110 in direction $\phi_1=0$ and a second codeword $V(\theta_2)$ to steer beam 1120 in direction $n\phi_2=20$ degrees, where codewords $V(\theta_1)$ and $V(\theta_2)$ may be either RF-only or IF- and RF-beamforming codewords and either linear or non-linear optimized codewords. As shown in chart 1110, such may produce beams 1110 and 1120 that may collectively form a "broader" beam. While the second beamforming technique may be effective in certain scenarios, the creation of neighboring beams with appropriately steered main lobes and nulls may be complex; consequently, the first beamforming technique may be more applicable.

While modular beamformer 500 is detailed above as being configured to produce individual beams from each of modules 502-508, e.g. up to four individually steerable beams in the exemplary configuration of FIG. 5, modular beamformer 500 may additionally be configured to produce individual beams from the "sub-modules" associated with each IF shifter. As previously noted, each of IF shifters 502c-508c may be connected to P RF shifters of RF shifters 502f-508f and similarly P antenna elements of antenna array 502i-508i. As opposed to using the L antenna elements of each of modules 502-508 in a primary phase shifting role to produce up to $N_{RF}$ steerable beams, modular beamformer 500 may instead utilize the P antenna elements connected to each of the $MN_{RF}$ IF shifters 502c-508c to produce up to $MN_{RF}$ steerable beams. In such an implementation, modular beamformer 500 may utilize each of the P antenna elements in a primary phase shifting role for each sub-module and the $MN_{RF}$ IF shifters in a secondary phase shifting role, thus allowing modular beamformer 500 to analogously produce multiple-beams and combined beams with each of the sub-modules. Such may function in an analogous manner as previously detailed, with control circuit 512 selecting a codeword for each sub-module (each codeword composed of P elements) to steer each beam and assigning each IF shifter with a beamforming weight (either codebook- or non-codebook-based) to implement the P$\theta$ phase separations needed for generating combined beams from multiple sub-modules.

Figure 12:
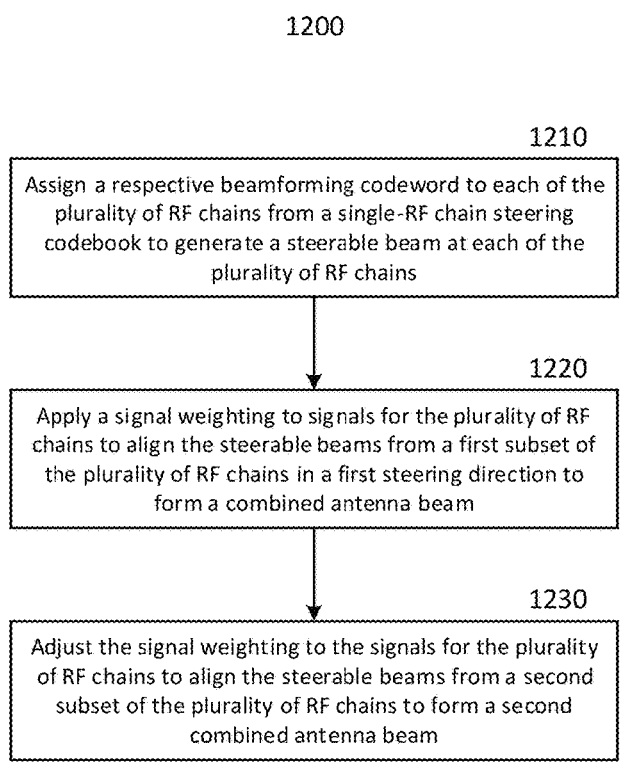
FIG. 12 shows a method of operating a radio communication device.

FIG. 12 shows method 1200 of operating a radio communication device comprising a plurality of antenna arrays, where the plurality of antenna arrays are configured to generate steerable antenna beams according to respective beamforming codewords. As shown in FIG. 12, method 1200 includes assigning a respective beamforming codeword to each of the plurality of antenna arrays from a single-antenna-array steering codebook to generate a steerable beam at each of the plurality of RF chains (1210), applying a signal weighting to signals for the plurality of antenna arrays to align the steerable beams from a first subset of the plurality of antenna arrays in a first steering direction to form a combined antenna beam (1220), and adjusting the signal weighting to the signals for the plurality of antenna arrays to align the steerable beams from a second subset of the plurality of antenna arrays to form a second combined antenna beam (1230).

In one or more further exemplary aspects of the disclosure, one or more of the features described above in reference to FIGS. 1-11 may be further incorporated into method 1200. In particular, method 1200 may be configured to perform further and/or alternate processes as detailed regarding modular beamformer 400 and/or modular beamformer 500.

The terms "user equipment", "UE", "mobile terminal", "user terminal", etc., may apply to any wireless communication device, including cellular phones, tablets, laptops, personal computers, wearables, multimedia playback and other handheld electronic devices, consumer/home/office/commercial appliances, vehicles, and any number of additional electronic devices capable of wireless communications.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

The following examples pertain to further aspects of this disclosure:

Example 1 is a radio communication device including a plurality of antenna arrays each configured to generate a steerable antenna beam according to a respective beamforming codeword, wherein each of the plurality of antenna arrays is configured to obtain the respective beamforming codeword from a single-antenna-array steering codebook that is reused by each of the plurality of antenna arrays, and a beamforming circuit configured to weight signals for the plurality of antenna arrays to coordinate the steerable antenna beams from a subset of the plurality of antenna arrays to form a combined antenna beam in a first steering direction.

In Example 2, the subject matter of Example 1 can optionally include wherein the respective beamforming codewords each include a plurality of complex valued beamforming weights, and wherein the plurality of antenna arrays are each configured to generate the respective steerable antenna beam by applying the plurality of complex beamforming weights of the respective beamforming codeword to a plurality of weighting circuits of each antenna array.

In Example 3, the subject matter of Example 2 can optionally include wherein the plurality of weighting circuits are a plurality of radio frequency (RF) beamforming circuits.

In Example 4, the subject matter of Example 1 can optionally include wherein each beamforming codeword of the single-antenna-array steering codebook is designed to provide antenna array steering in a predefined steering direction.

In Example 5, the subject matter of any one of Examples 1 to 4 can optionally include wherein the subset of the plurality of antenna arrays are each configured to utilize the same beamforming codeword from the single-antenna-array steering codebook to generate the steerable antenna beams of the combined antenna beam.

In Example 6, the subject matter of any one of Examples 1 to 5 can optionally include wherein each beamforming codeword of the single-antenna-array chain steering codebook corresponds to a respective linear progressive phase shifted codeword.

In Example 7, the subject matter of Example 6 can optionally include wherein each steering codeword of the single-antenna-array steering codebook is a linear progressive phase-shifted codeword or approximates a linear progressive phase-shifted codeword.

In Example 8, the subject matter of any one of Examples 1 to 7 can optionally include wherein the beamforming circuit is configured to weight the signals for the plurality of antenna arrays to coordinate the steerable antenna beams from the subset of the plurality of antenna arrays to form the combined antenna beam in the first steering direction by applying a phase shift to each of the signals for each of the subset of the plurality of antenna arrays to create a predefined phase separation between each of the signals.

In Example 9, the subject matter of any one of Examples 1 to 8 can optionally include wherein the subset of the plurality of antenna arrays with coordinated beams that generate the combined antenna beam is adjustable.

In Example 10, the subject matter of any one of Examples 1 to 8 can optionally include wherein the beamforming circuit is configured to change the weighting of the signals for the plurality of antenna arrays to generate different combined antenna beams from the steerable antenna beams of different subsets of the plurality of antenna arrays, wherein each of the plurality of antenna arrays of the different subsets of the plurality of antenna arrays are configured to reuse the single-antenna-array steering codebook to generate the steerable antenna beams that form the different combined antenna beams.

In Example 11, the subject matter of any one of Examples 1 to 8 can optionally include wherein the beamforming circuit is configured to adjust the weighting of the signals for the plurality of antenna arrays to coordinate the steerable antenna beams from a second subset of the plurality of antenna arrays to form a second combined antenna beam in a second steering direction.

In Example 12, the subject matter of Example 11 can optionally include wherein the second subset of the plurality of antenna arrays is a different size than the subset of the plurality of antenna arrays and wherein the subset of the plurality of antenna arrays.

In Example 13, the subject matter of Example 11 or 12 can optionally include wherein the second subset of the plurality of antenna arrays are configured to utilize the single-antenna-array steering codebook to form the first combined antenna beam and the second combined antenna beam.

In Example 14, the subject matter of any one of Examples 1 to 13 can optionally further include a plurality of radio frequency (RF) chains, wherein each of the plurality of antenna arrays is connected to a respective RF chain of the plurality of RF chains.

In Example 15, the subject matter of any one of Examples 1 to 14 can optionally include wherein the beamforming circuit is a digital baseband beamforming circuit.

In Example 16, the subject matter of any one of Examples 1 to 8 can optionally include wherein the beamforming circuit is configured to adjust the weighting of the signals for the plurality of antenna arrays to steer the steerable antenna beams from the plurality of antenna arrays in a plurality of different steering directions.

In Example 17, the subject matter of any one of Examples 1 to 8 can optionally include wherein the plurality of antenna arrays are configured to steer the steerable antenna beams in a plurality of different steering directions according to the respective beamforming codewords.

In Example 18, the subject matter of Example 16 or 17 can optionally include wherein the plurality of different steering directions correspond to a plurality of different users.

In Example 19, the subject matter of any one of Examples 1 to 18 can optionally further include a plurality of beam broadening circuits configured to process the signals for the plurality of antenna arrays to broaden the combined antenna beam.

In Example 20, the subject matter of Example 19 can optionally include wherein the plurality of beam broadening circuits are a plurality of intermediate frequency (IF) weighting circuits each configured to apply a beamforming weight according to a predefined beam broadening weight pattern to broaden the combined antenna beam.

In Example 21, the subject matter of any one of Examples 1 to 18 can optionally include wherein the beamforming circuit is configured to apply a predefined beam broadening weight pattern to the signals for the plurality of antenna arrays to broaden the combined antenna beam.

In Example 22, the subject matter of any one of Examples 1 to 21 can optionally include wherein the plurality of antenna arrays are configured to transmit wireless signals via the steerable antenna beams or receive wireless signals via the steerable antenna beams.

In Example 23, the subject matter of any one of Examples 1 to 22 can optionally further include one or more memory circuits configured to store the single-antenna-array steering codebook.

In Example 24, the subject matter of any one of Examples 1 to 23 can optionally be configured as a base station.

Example 25 is a radio communication device including a plurality of antenna arrays each including a plurality of intermediate frequency (IF) beamforming circuits and a plurality of radio frequency (RF) beamforming circuits, wherein the plurality of RF beamforming circuits are configured to steer an antenna beam for the corresponding antenna array according to a respective steering codeword and the plurality of IF beamforming circuits are configured to performing beam broadening on the antenna beam for the corresponding antenna array according to a respective broadening codeword, and a digital beamforming circuit configured to weight signals for the plurality of antenna arrays to coordinate the steerable antenna beams from a subset of the plurality of antenna arrays to form a combined antenna beam in a first steering direction.

In Example 26, the subject matter of Example 25 can optionally include wherein the respective steering codeword for the plurality of RF beamforming circuits of each of the plurality of antenna arrays is selected from a single-antenna-array steering codebook that is reused by each of the plurality of antenna arrays.

In Example 27, the subject matter of Example 25 or 26 can optionally include wherein each of the respective broadening codewords specifies a phase distribution for application by the plurality of IF beamforming circuits.

In Example 28, the subject matter of any one of Examples 25 to 27 can optionally include wherein each of the plurality of IF beamforming circuits of a given antenna array of the plurality of antenna arrays is connected to a subset of the plurality of RF beamforming circuits of the antenna array, and wherein each of the plurality of IF beamforming circuits is configured to apply a signal weighting to signals for the respective subset of the plurality of RF beamforming circuits.

In Example 29, the subject matter of Example 28 can optionally include wherein the respective broadening codewords specify the signal weighting applied by each of the plurality of IF beamforming circuits.

In Example 30, the subject matter of Example 28 can optionally include wherein the signal weightings applied by the plurality of IF beamforming of each of the plurality of antenna arrays create a predefined phase distribution across the signals for the plurality of RF beamforming circuits.

In Example 31, the subject matter of any one of Examples 28 to 30 can optionally include wherein the signal weightings are a phase weights or a gain weights.

In Example 32, the subject matter of any one of Examples 25 to 31 can optionally further include a plurality of RF chains, wherein each of the plurality of antenna arrays is connected to a respective RF chain of the plurality of RF chains.

In Example 33, the subject matter of any one of Examples 25 to 32 can optionally include wherein the respective broadening codewords are selected from a broadening codebook including a plurality of broadening codewords, each of the plurality of broadening codewords of the broadening codeword corresponding to different degree of beam broadening.

In Example 34, the subject matter of any one of Examples 25 to 33 can optionally include wherein the respective steering codewords and the respective broadening codewords each include a plurality of complex-valued beamforming weights.

In Example 35, the subject matter of Example 34 can optionally include wherein each given antenna array of the plurality of antenna arrays is configured to generate the respective steerable antenna beam by applying the plurality of complex-valued beamforming weights of the respective steering codeword at the plurality of RF beamforming circuits of the antenna array.

In Example 36, the subject matter of any one of Examples 25 to 35 can optionally include wherein each respective steering codeword is designed to provide antenna array steering in a predefined steering direction.

In Example 37, the subject matter of any one of Examples 25 to 36 can optionally include wherein the subset of the plurality of antenna arrays are each configured to utilize the same steering codeword of the single-antenna-array steering codebook to generate the steerable antenna beams of the combined antenna beam.

In Example 38, the subject matter of any one of Examples 25 to 37 can optionally include wherein each steering codeword of the single-antenna-array steering codebook corresponds to a respective linear progressive phase-shifted codeword.

In Example 39, the subject matter of Example 38 can optionally include wherein each steering codeword of the single-antenna-array steering codebook is a linear progressive phase-shifted codeword or approximates a linear progressive phase-shifted codeword.

In Example 40, the subject matter of any one of Examples 25 to 39 can optionally include wherein the digital beamforming circuit is configured to weight the signals for the plurality of antenna arrays to coordinate the steerable antenna beams by applying a phase shift to each of the signals for each of the plurality of antenna arrays to create a predefined phase separation between each of the signals.

In Example 41, the subject matter of any one of Examples 25 to 40 can optionally include wherein the subset of the plurality of antenna arrays with coordinate beams that generate the combined antenna beam is adjustable.

In Example 42, the subject matter of any one of Examples 25 to 40 can optionally include wherein the digital beamforming circuit is configured to change the weighting of the signals for the plurality of antenna arrays to generate different combined antenna beams from the steerable antenna beams of different subsets of the plurality of antenna arrays, wherein each of the plurality of antenna arrays of the different subsets of the plurality of antenna arrays are configured to reuse the single-antenna-array steering codebook to generate the steerable antenna beams that form the different combined antenna beams.

In Example 43, the subject matter of any one of Examples 25 to 40 can optionally include wherein the beamforming circuit is configured to adjust the weighting of the signals for the plurality of antenna arrays to coordinate the steerable antenna beams from a second subset of the plurality of antenna arrays to form a second combined antenna beam in a second steering direction.

In Example 44, the subject matter of Example 43 can optionally include wherein the second subset of the plurality of antenna arrays is a different size than the subset of the plurality of antenna arrays.

In Example 45, the subject matter of Example 43 or 44 can optionally include wherein the second subset of the plurality of antenna arrays is configured to utilize the single-antenna-array steering codebook to form the first combined antenna beam and the second combined antenna beam.

In Example 46, the subject matter of any one of Examples 25 to 40 can optionally include wherein the digital beamforming circuit is configured to adjust the weighting of the signals for the plurality of antenna arrays to steer the steerable antenna beams from the plurality of antenna arrays in a plurality of different steering directions.

In Example 47, the subject matter of Example 46 can optionally include wherein the plurality of different steering directions correspond to a plurality of different users.

In Example 48, the subject matter of any one of Examples 25 to 47 can optionally include wherein the plurality of antenna arrays are configured to transmit wireless signals via the steerable antenna beams or receive wireless signals via the steerable antenna beams.

In Example 49, the subject matter of any one of Examples 25 to 48 can optionally further include one or more memory circuits configured to store the single-antenna-array steering codebook.

In Example 50, the subject matter of any one of Examples 25 to 49 can optionally be configured as a base station.

Example 51 is a method of operating a radio communication device including a plurality of antenna arrays, the plurality of antenna arrays configured to generate steerable antenna beams according to respective beamforming codewords, the method including assigning a respective beamforming codeword to each of the plurality of antenna arrays from a single-antenna-array steering codebook to generate a steerable beam at each of the plurality of antenna arrays, applying a signal weighting to signals for the plurality of antenna arrays to coordinate the steerable antenna beams from a first subset of the plurality of antenna arrays to form a combined antenna beam in a first steering direction, and adjusting the signal weighting to the signals for the plurality of antenna arrays to coordinate the steerable antenna beams from a second subset of the plurality of antenna arrays to form a second combined antenna beam.

In Example 52, the subject matter of Example 51 can optionally include wherein the first subset of the plurality of antenna arrays and the second subset of the plurality of antenna arrays are configured to form the first combined antenna beam and the second combined antenna beam using the single-antenna-array steering codebook.

In Example 53, the subject matter of Example 51 or 52 can optionally include wherein the first subset is a different size than the second subset.

In Example 54, the subject matter of any one of Examples 51 to 53 can optionally include wherein the respective beamforming codewords of the single-antenna-array beamforming codebook each include a plurality of complex-valued beamforming weights.

In Example 55, the subject matter of Example 54 can optionally further include applying the plurality of complex-valued beamforming weights of the assigned respective beamforming codewords at a plurality of weighting circuits connected to an antenna array of each antenna arrays to generate the steerable beam of each of the plurality of antenna arrays.

In Example 56, the subject matter of Example 55 can optionally include wherein the plurality of weighting circuits are a plurality of radio frequency (RF) beamforming circuits.

In Example 57, the subject matter of any one of Examples 51 to 56 can optionally include wherein each beamforming codeword of the single-antenna-array steering codebook is designed to provide antenna array steering in a predefined steering direction.

In Example 58, the subject matter of any one of Examples 51 to 57 can optionally include wherein assigning the respective beamforming codeword to each of the plurality of antenna arrays from the single-antenna-array steering codebook to generate the steerable beam at each of the plurality of antenna arrays includes assigning each of the plurality of antenna arrays the same beamforming codeword from the single-antenna-array steering codebook.

In Example 59, the subject matter of any one of Examples 51 to 58 can optionally include wherein each beamforming codeword of the single-antenna-array steering codebook corresponds to a respective linear progressive phase shifted codeword.

In Example 60, the subject matter of Example 59 can optionally include wherein each steering codeword of the single-antenna-array steering codebook is a linear progressive phase-shifted codeword or approximates a linear progressive phase-shifted codeword.

In Example 61, the subject matter of any one of Examples 51 to 60 can optionally include wherein applying the signal weighting to the signals for the plurality of antenna arrays to coordinate the steerable antenna beams from the subset of the plurality of antenna arrays to form the combined antenna beam in the first steering direction includes applying a phase shift to each of the signals for each of the subset of the plurality of antenna arrays to create a predefined phase separation between each of the signals.

In Example 62, the subject matter of Example 61 can optionally include wherein the second combined antenna beam is steered in a second steering direction different from the first steering direction.

In Example 63, the subject matter of any one of Examples 51 to 60 can optionally further include applying a different signal weighting to steer the antenna beams of the plurality of antenna arrays in a plurality of different steering directions.

In Example 64, the subject matter of Example 63 can optionally include wherein the plurality of different steering directions correspond to a plurality of different users.

In Example 65, the subject matter of any one of Examples 51 to 64 can optionally further include applying a beam broadening signal weighting to the signals of the plurality of antenna arrays to broaden the combined antenna beam.

In Example 66, the subject matter of any one of Examples 51 to 64 can optionally include wherein the radio communication device further includes a plurality of radio frequency (RF) chains each connected to a respective antenna array of the plurality of antenna arrays.

Example 67 is a radio communication device including a plurality of antenna arrays each configured to generate a steerable antenna beam according to a respective beamforming codeword, wherein each of the plurality of antenna arrays is configured to obtain the respective beamforming codeword from a single-antenna-array steering codebook that is common to each of the plurality of antenna arrays, and a beamforming circuit configured to weight signals for the plurality of antenna arrays to coordinate the steerable antenna beams from a subset of the plurality of antenna arrays independently of the respective beamforming codewords assigned to the plurality of antenna arrays to form a combined antenna beam in a first steering direction.

In Example 68, the subject matter of Example 67 can optionally include wherein the respective beamforming codewords each include a plurality of complex valued beamforming weights, and wherein the plurality of antenna arrays are each configured to generate the respective steerable antenna beam by applying the plurality of complex beamforming weights of the respective beamforming codeword to a plurality of weighting circuits.

In Example 69, the subject matter of Example 68 can optionally include wherein each of the plurality of weighting circuits is connected to a respective antenna of the plurality of antenna arrays.

In Example 70, the subject matter of Example 68 can optionally include wherein the plurality of weighting circuits are a plurality of RF beamforming circuits.

In Example 71, the subject matter of any one of Examples 67 to 70 can optionally include wherein each beamforming codeword of the single-antenna-array steering codebook is designed to provide antenna array steering in a predefined steering direction.

In Example 72, the subject matter of any one of Examples 67 to 71 can optionally include wherein the plurality of antenna arrays are each configured to utilize the same beamforming codeword from the single-antenna-array steering codebook to generate the steerable antenna beams of the combined antenna beam.

In Example 73, the subject matter of any one of Examples 67 to 72 can optionally include wherein each beamforming codeword of the single-antenna-array steering codebook corresponds to a respective linear progressive phase shifted codeword.

In Example 74, the subject matter of Example 73 can optionally include wherein each steering codeword of the single-antenna-array steering codebook is a linear progressive phase-shifted codeword or approximates a linear progressive phase-shifted codeword.

In Example 75, the subject matter of any one of Examples 67 to 74 can optionally include wherein the beamforming circuit is configured to weight the signals for the plurality of antenna arrays to coordinate the steerable antenna beams from the subset of the plurality of antenna arrays to form the combined antenna beam in the first steering direction by applying a phase shift to each of the signals for each of the subset of the plurality of antenna arrays to create a predefined phase separation between each of the signals.

In Example 76, the subject matter of any one of Examples 67 to 75 can optionally include wherein the subset of the plurality of antenna arrays with coordinated beams that generate the combined antenna beam is adjustable and each reuse the single-antenna-array steering codebook to generate the combined antenna beam.

In Example 77, the subject matter of any one of Examples 67 to 75 can optionally include wherein the beamforming circuit is configured to change the weighting of the signals for the plurality of antenna arrays to generate different combined antenna beams from the steerable antenna beams of different subsets of the plurality of antenna arrays, wherein each of the plurality of antenna arrays of the different subsets of the plurality of antenna arrays are configured to reuse the single-antenna-array steering codebook to generate the steerable antenna beams that form the different combined antenna beams.

In Example 78, the subject matter of any one of Examples 67 to 75 can optionally include wherein the beamforming circuit is configured to adjust the weighting of the signals for the plurality of antenna arrays to coordinate the steerable antenna beams from a second subset of the plurality of antenna arrays to form a second combined antenna beam in a second steering direction.

In Example 79, the subject matter of Example 78 can optionally include wherein the second subset of the plurality of antenna arrays is a different size than the subset of the plurality of antenna arrays and wherein the subset of the plurality of antenna arrays.

In Example 80, the subject matter of Example 78 can optionally include 79, wherein the second subset of the plurality of antenna arrays are configured to utilize the single-antenna-array steering codebook to form the first combined antenna beam and the second combined antenna beam.

In Example 81, the subject matter of any one of Examples 67 to 80 can optionally include wherein the beamforming circuit is a digital baseband beamforming circuit.

In Example 82, the subject matter of any one of Examples 67 to 75 can optionally include wherein the beamforming circuit is configured to adjust the weighting of the signals for the plurality of antenna arrays to steer the steerable antenna beams from the plurality of antenna arrays in a plurality of different steering directions.

In Example 83, the subject matter of any one of Examples 67 to 75 can optionally include wherein the plurality of antenna arrays are configured to steer the steerable antenna beams in a plurality of different steering directions according to the respective beamforming codewords.

In Example 84, the subject matter of Example 82 or 83 can optionally include wherein the plurality of different steering directions correspond to a plurality of different users.

In Example 85, the subject matter of any one of Examples 67 to 84 can optionally further include a plurality of beam broadening circuits configured to process the signals for the plurality of antenna arrays to broaden the combined antenna beam.

In Example 86, the subject matter of Example 85 can optionally include wherein the plurality of beam broadening circuits are a plurality of intermediate frequency (IF) weighting circuits each configured to apply a beamforming weight according to a predefined beam broadening weight pattern to broaden the combined antenna beam.

In Example 87, the subject matter of any one of Examples 67 to 84 can optionally include wherein the beamforming circuit is configured to apply a predefined beam broadening weight pattern to the signals for the plurality of antenna arrays to broaden the combined antenna beam.

In Example 88, the subject matter of any one of Examples 67 to 87 can optionally include wherein the plurality of antenna arrays are configured to transmit wireless signals via the steerable antenna beams or receive wireless signals via the steerable antenna beams.

In Example 89, the subject matter of any one of Examples 67 to 88 can optionally further include one or more memory circuits configured to store the single-antenna-array steering codebook.

In Example 90, the subject matter of any one of Examples 67 to 88 can optionally further include a plurality of radio frequency (RF) chains, wherein each of the plurality of antenna arrays is connected to a respective RF chain of the plurality of RF chains.

In Example 91, the subject matter of any one of Examples 67 to 90 can optionally be configured as a base station.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio communication device comprising:
    a plurality of antenna arrays each configured to generate a steerable antenna beam according to a respective beamforming codeword, wherein each of the plurality of antenna arrays is configured to obtain the respective beamforming codeword from a single-antenna-array steering codebook that is common to each of the plurality of antenna arrays; and
    a beamforming circuit configured to weight signals for the plurality of antenna arrays to coordinate the steerable antenna beams from a subset of the plurality of antenna arrays independently of the respective beamforming codewords assigned to the plurality of antenna arrays to form a combined antenna beam in a first steering direction.

2. The radio communication device of claim 1, wherein the respective beamforming codewords each comprise a plurality of complex valued beamforming weights, and wherein the plurality of antenna arrays are each configured to generate the respective steerable antenna beam by applying the plurality of complex beamforming weights of the respective beamforming codeword to a plurality of weighting circuits.

3. The radio communication device of claim 2, wherein the plurality of weighting circuits are a plurality of RF beamforming circuits.

4. The radio communication device of claim 1, wherein each beamforming codeword of the single-antenna-array steering codebook is designed to provide antenna array steering in a predefined steering direction.

5. The radio communication device of claim 1, wherein each beamforming codeword of the single-antenna-array steering codebook corresponds to a linear progressive phase shifted codeword.

6. The radio communication device of claim 1, wherein the beamforming circuit is configured to weight the signals for the plurality of antenna arrays to coordinate the steerable antenna beams from the subset of the plurality of antenna arrays to form the combined antenna beam in the first steering direction by:
    applying a phase shift to each of the signals for each of the subset of the plurality of antenna arrays to create a predefined phase separation between each of the signals.

7. The radio communication device of claim 1, wherein the subset of the plurality of antenna arrays with coordinated beams that generate the combined antenna beam is adjustable and each reuse the single-antenna-array steering codebook to generate the combined antenna beam.

8. The radio communication device of claim 1, wherein the beamforming circuit is configured to change the weighting of the signals for the plurality of antenna arrays to generate different combined antenna beams from the steerable antenna beams of different subsets of the plurality of antenna arrays, wherein each of the plurality of antenna arrays of the different subsets of the plurality of antenna arrays are configured to reuse the single-antenna-array steering codebook to generate the steerable antenna beams that form the different combined antenna beams.

* * * * *